US008635301B2

(12) United States Patent
Kojima

(10) Patent No.: US 8,635,301 B2
(45) Date of Patent: *Jan. 21, 2014

(54) CONTENT MANAGEMENT APPARATUS, WEB SERVER, NETWORK SYSTEM, CONTENT MANAGEMENT METHOD, CONTENT INFORMATION MANAGEMENT METHOD, AND PROGRAM

(75) Inventor: Tamaki Kojima, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/315,616

(22) Filed: Dec. 9, 2011

(65) Prior Publication Data

US 2012/0079073 A1 Mar. 29, 2012

Related U.S. Application Data

(63) Continuation of application No. 11/841,319, filed on Aug. 20, 2007, now Pat. No. 8,185,577.

(30) Foreign Application Priority Data

Sep. 26, 2006 (JP) ................................ 2006-261460

(51) Int. Cl.
G06F 15/16 (2006.01)
(52) U.S. Cl.
USPC ........... 709/217; 709/203; 709/219; 709/228; 709/229
(58) Field of Classification Search
USPC .................. 709/217, 203, 218, 219, 228, 229
See application file for complete search history.

(56) References Cited

U.S. PATENT DOCUMENTS

| 7,099,861 B2 | 8/2006 | Youn |
| 2002/0112180 A1 | 8/2002 | Land et al. |
| 2003/0028896 A1 | 2/2003 | Swart et al. |

(Continued)

FOREIGN PATENT DOCUMENTS

| CN | 1533541 A | 9/2004 |
| CN | 1585944 A | 2/2005 |

(Continued)

OTHER PUBLICATIONS

Japanese Office Action issued Nov. 11, 2008 in patent application No. 2006-261460.

(Continued)

Primary Examiner — Yves Dalencourt
(74) Attorney, Agent, or Firm — Oblon, Spivak, McClelland, Maier & Neustadt, L.L.P.

(57) ABSTRACT

A content management apparatus includes a content storage section configured to store a piece of content together with a content unique identifier; a content transmitter configured to transmit the piece of content together with the content unique identifier to a Web server; an intra-server management identifier receiver configured to receive an intra-server management identifier corresponding to the content unique identifier from the Web server; a management table for storing the content unique identifier and the intra-server management identifier; a content information updating message receiver configured to receive content information on the piece of content and a content information updating message containing the intra-server management identifier from the Web server; an identifier converter configured to convert the intra-server management identifier contained in the content information updating message into the content unique identifier; and a content management section configured to allow the content storage section to store the content information.

32 Claims, 23 Drawing Sheets

(56) References Cited

U.S. PATENT DOCUMENTS

| | | |
|---|---|---|
| 2003/0065747 A1* | 4/2003 | Sakamoto et al. ............ 709/219 |
| 2005/0080764 A1 | 4/2005 | Ito |
| 2005/0080767 A1 | 4/2005 | Dietz et al. |
| 2005/0154723 A1 | 7/2005 | Liang |
| 2005/0228825 A1 | 10/2005 | Yang |

FOREIGN PATENT DOCUMENTS

| | | |
|---|---|---|
| JP | 2002-297945 | 10/2002 |
| JP | 2003-85265 | 3/2003 |
| JP | 2005-20256 | 1/2005 |
| JP | 2005-196529 | 7/2005 |
| JP | 2005-276187 | 10/2005 |
| JP | 2006-185286 | 7/2006 |

OTHER PUBLICATIONS

Chinese Office Action issued Jun. 5, 2009 in patent application No. 200710153103.1 with English translation.

Office Action mailed Dec. 11, 2009 in U.S. Appl. No. 11/841,319.

Office Action mailed Nov. 15, 2010 in U.S. Appl. No. 11/841,319.

Koji Koretsu, "Present Condition of Web Search Technologies and Future Prospects—for Web 2.0 Era", Artificial Intelligence Studies Bulletin, Japan, Artificial Intelligence Society, Jul. 1, 2006, vol. 21, No. 4, 11 pages.

Office Action issued Sep. 13, 2011, in Japanese Patent Application No. 2008-329560 filed Dec. 25, 2008 (with English-language Translation).

* cited by examiner

FIG. 7

| CONTENT UNIQUE IDENTIFIER | SERVER IDENTIFIER | INTRA-SERVER MANAGEMENT IDENTIFIER |
|---|---|---|
| 024DEE41-33E7-11D3-9D69-0008C781F39F | http://blog.so-net.ne.jp/ | 101 |
| E2A1E728-32E3-11D6-A682-7B03A0000000 | http://blog.so-net.ne.jp/ | 102 |
| 516E7CB5-6ECF-11D6-8FF8-00022D09712B | http://blog.so-net.ne.jp/ | 103 |
| ..... | ..... | ..... |

FIG. 8

```
<?xml version="1.0" encoding="utf-8" ?>
<rdf:RDF xmlns:rdf="http://www.w3.org/1999/02/22-rdf-syntax-ns#" xmlns:dc="http://purl.org/dc/elements/1.1/" xmlns:admin="http://webns.net/mvcb/" xmlns:cc="http://web.resource.org/cc/" xmlns="http://purl.org/rss/1.0/">
<channel rdf:about="http://www.hogehoge.com/hogehoge/">
<title>hogehoge</title>
<link>http://www.hogehoge.com/hogehoge/</link>
<description> UP-TO-DATE COMMENT </description>
<dc:language>ja</dc:language>
<dc:date>2006-06-27T20:08:24+09:00</dc:date>
<admin:generatorAgent rdf:resource="http://www.movabletype.org/?v=3.2-ja-2" />
<items>
<rdf:Seq>
<rdf:li rdf:resource="http://www.hogehoge.com/hoge/archives/00101.html" />   ← 801
<rdf:li rdf:resource="http://www.hogehoge.com/hoge/archives/00101.html" />
<rdf:li rdf:resource="http://www.hogehoge.com/hoge/archives/00102.html" />
</rdf:Seq>
</items>
</channel>
<item rdf:about="http://www.hogehoge.com/hoge/archives/00101.html#c025022">
<title> MY DOG </title>
<link>http://www.hogehoge.com/hoge/archives/00101.html#c025022</link>
<description> CUTE! </description>   ← 802
<content:encoded><![CDATA[<p> CUTE! <br/></p>]]></content:encoded>
<dc:date>2006-06-20T23:18:14+09:00</dc:date>
</item>
<item rdf:about="http://www.hogehoge.com/hoge/archives/00101.html#c025023">
<title> MY DOG </title>
<link>http://www.hogehoge.com/hoge/archives/00101.html#c025023</link>
<description> DROOPING EARS! </description>
<content:encoded><![CDATA[<p>DROOPING EARS! <br/></p>]]></content:encoded>
<dc:date>2006-06-20T23:25:44+09:00</dc:date>
</item>
<item rdf:about="http://www.hogehoge.com/hoge/archives/00102.html#c019689">
<title> ASAKUSA TEMPLE </title>
<link>http://www.hogehoge.com/hoge/archives/00102.html#c019689</link>
<description> ASAKUSA TEMPLE, I WENT THE OTHER DAY, WE MAY HAVE PASSED EACH OTHER!</description>
<content:encoded><![CDATA[<p>ASAKUSA TEMPLE, I WENT THE OTHER DAY, WE MAY HAVE PASSED EACH OTHER! <<br/></p>]]></content:encoded>
<dc:date>2006-06-22T01:02:12+09:00</dc:date>
</item>
</rdf:RDF>
```

```
<?xml version="1.0" encoding="utf-8" ?>
<rdf:RDF xmlns:rdf="http://www.w3.org/1999/02/22-rdf-syntax-ns#" xmlns:dc="http://
purl.org/dc/elements/1.1/" xmlns:admin="http://webns.net/mvcb/" xmlns:cc="http://
web.resource.org/cc/" xmlns="http://purl.org/rss/1.0/">
<channel rdf:about="http://www.hogehoge.com/hogehoge/">
<title>hogehoge</title>
<link>http://www.hogehoge.com/hogehoge/</link>
<description> UP-TO-DATE TAG</description>
<dc:language>ja</dc:language>
<dc:date>2006-06-27T20:08:24+09:00</dc:date>
<admin:generatorAgent rdf:resource="http://www.movabletype.org/?v=3.2-ja-2" />
<items>                                                                811
<rdf:Seq>
<rdf:li rdf:resource="http://www.hogehoge.com/hoge/archives/00101.html" />
<rdf:li rdf:resource="http://www.hogehoge.com/hoge/archives/00101.html" />
<rdf:li rdf:resource="http://www.hogehoge.com/hoge/archives/00102.html" />
</rdf:Seq>
</items>
</channel>
<item rdf:about="http://www.hogehoge.com/hoge/archives/00101.html#tag">
<title> MY DOG </title>
<link>http://www.hogehoge.com/hoge/archives/00101.html#tag</link>
<dc:subject>Cute:Cool</dc:subject>   812
<dc:date>2006-06-20T23:18:14+09:00</dc:date>
</item>
<item rdf:about="http://www.hogehoge.com/hoge/archives/00102.html#c019689">
<title> ASAKUSA TEMPLE </title>
<link>http://www.hogehoge.com/hoge/archives/00102.html#c019689</link>
<dc:subject>Cool:Traditional</dc:subject>
<dc:date>2006-06-22T01:02:12+09:00</dc:date>
</item>
</rdf:RDF>
```

```
<?xml version="1.0" encoding="utf-8" ?>
<rdf:RDF xmlns:rdf="http://www.w3.org/1999/02/22-rdf-syntax-ns#" xmlns:dc="http://purl.org/dc/elements/1.1/" xmlns:admin="http://webns.net/mvcb/" xmlns:cc="http://web.resource.org/cc/" xmlns="http://purl.org/rss/1.0/">
<channel rdf:about="http://www.hogehoge.com/hogehoge/">
<title>hogehoge</title>
<link>http://www.hogehoge.com/hogehoge/</link>
<description> REFERENCE COUNT </description>
<dc:language>ja</dc:language>
<dc:date>2006-06-27T20:08:24+09:00</dc:date>
<admin:generatorAgent rdf:resource="http://www.movabletype.org/?v=3.2-ja-2" />
<items>
<rdf:Seq>
<rdf:li rdf:resource="http://www.hogehoge.com/hoge/archives/00101.html" />     821
<rdf:li rdf:resource="http://www.hogehoge.com/hoge/archives/00101.html" />
<rdf:li rdf:resource="http://www.hogehoge.com/hoge/archives/00102.html" />
</rdf:Seq>
</items>
</channel>
<item rdf:about="http://www.hogehoge.com/hoge/archives/00101.html#refcnt">
<title> MY DOG </title>
<link>http://www.hogehoge.com/hoge/archives/00101.html#refcnt</link>
<description>112</description>     822
<dc:date>2006-06-20T23:18:14+09:00</dc:date>
</item>
<item rdf:about="http://www.hogehoge.com/hoge/archives/00102.html#refcnt">
<title> ASAKUSA TEMPLE </title>
<link>http://www.hogehoge.com/hoge/archives/00102.html#refcnt</link>
<description>52</description>
<dc:date>2006-06-22T01:02:12+09:00</dc:date>
</item>
</rdf:RDF>
```

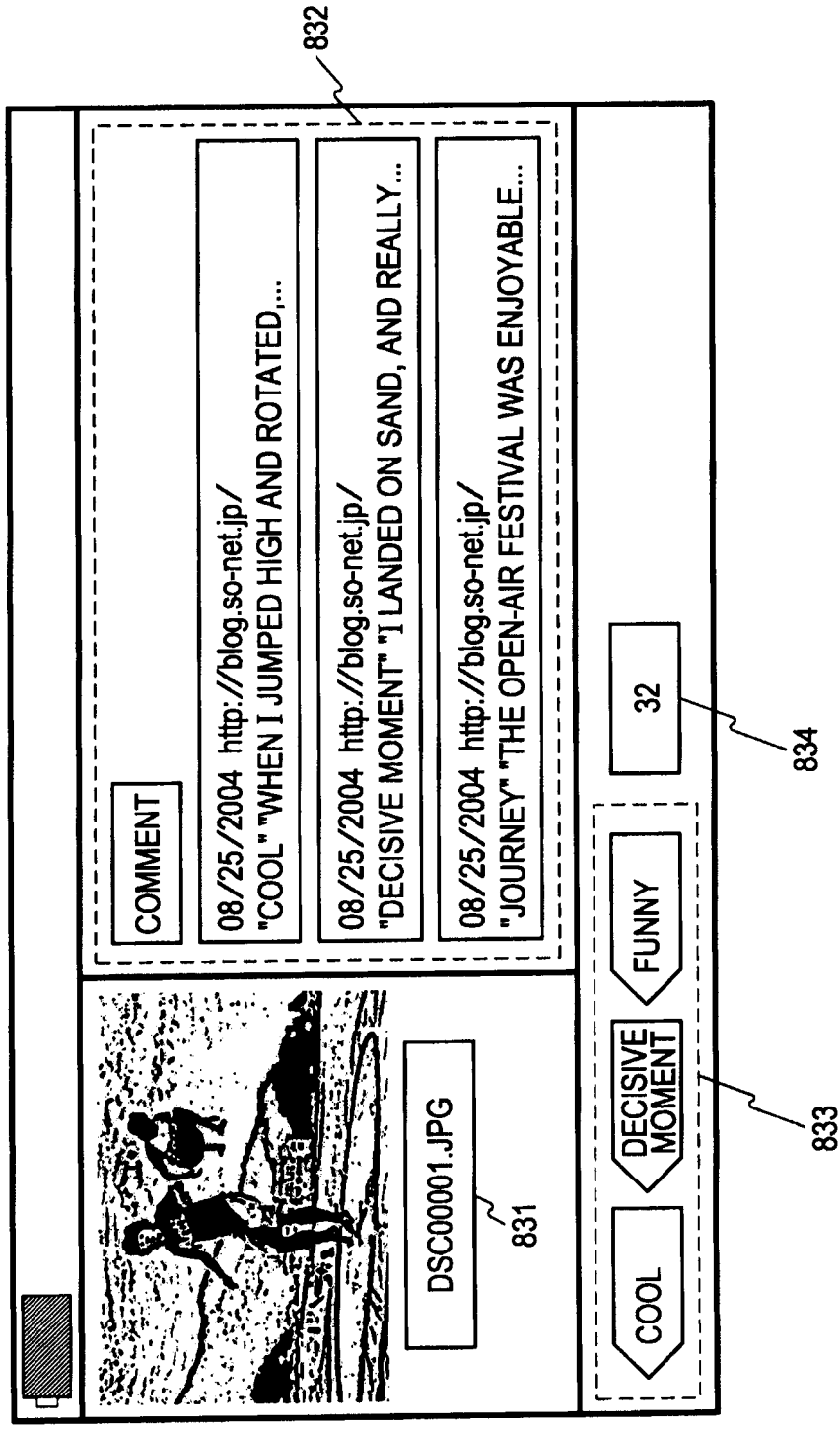

CONTENT MANAGEMENT APPARATUS, WEB SERVER, NETWORK SYSTEM, CONTENT MANAGEMENT METHOD, CONTENT INFORMATION MANAGEMENT METHOD, AND PROGRAM

CROSS REFERENCES TO RELATED APPLICATIONS

The present invention is a continuation application of U.S. application Ser. No. 11/841,319, entitled, "Content Management Apparatus, Web Server, Network System, Content Management Method, Content Information Management Method, and Program" and filed Aug. 20, 2007, which contains subject matter related to Japanese Patent Application JP 2006-261460 filed in the Japanese Patent Office on Sep. 26, 2006, the entire contents of both of which are incorporated herein by reference.

BACKGROUND OF THE INVENTION

1. Field of the Invention

The present invention relates to a content management apparatus. More particularly, the present invention relates to a content management apparatus for managing searches for information on content, to a Web server and a network system, which are used with the content management apparatus, to a processing method for use with the content management apparatus, the Web server, and the network system, and to a program for enabling a computer to perform such a processing method.

2. Description of the Related Art

In digital still cameras in recent years, comments regarding impressions, recollections, and the like of a user can be attached to many captured images so that they can be classified. An apparatus for managing content of such images is referred to as a content management apparatus. Examples of the content management apparatus include, in addition to a digital still camera, a personal computer, and the like.

It is possible for the content management apparatus to search for a keyword in a comment and extract target content. Usually, in such a case, it is assumed that a user has already input a comment in advance for each piece of content. As an example of such an apparatus of the related art, an album creation apparatus using a comment that has been input by a user has been proposed (refer to, for example, Japanese Unexamined Patent Application Publication No. 2003-85265 (FIG. 1)).

SUMMARY OF THE INVENTION

However, it is troublesome for a user to input comments to many pieces of content one by one, and it is practically difficult to attach a comment to all of the pieces of content.

Accordingly, it is desirable to efficiently manage pieces of information on content in order to improve the classification properties and searchability of the pieces of information.

The present invention has been made to solve the above-described problems. According to an embodiment of the present invention, there is provided a content management apparatus including: content storage means for storing a piece of content together with a content unique identifier; content transmission means for transmitting the piece of content together with the content unique identifier to a Web server; intra-server management identifier receiving means for receiving an intra-server management identifier corresponding to the content unique identifier from the Web server; a management table for storing the content unique identifier and the intra-server management identifier in such a manner as to be associated with each other; content information updating message receiving means for receiving a content information updating message containing content information on the piece of content and the intra-server management identifier from the Web server; identifier conversion means for converting the intra-server management identifier contained in the content information updating message into the content unique identifier by referring to the management table; and content management means for allowing the content storage means to store the content information on the basis of the content unique identifier. This brings about the effect in this content management apparatus that an intra-server management identifier is converted into a content unique identifier and a piece of content is managed using this content unique identifier.

The content management apparatus may further include: image-capturing means for capturing an image of a subject as the piece of content; and content unique identifier attaching means for attaching the content unique identifier corresponding to the piece of content. This brings about the effect that a content unique identifier is attached to a piece of image-captured content.

The content management apparatus may further include content information updating message request means for requesting the Web server for the content information updating message. This brings about the effect that a content information updating message is requested to the Web server.

The content management apparatus may further include: search condition acceptance means for accepting a search condition for searching for the content information; content search means for searching for the content information in accordance with the search condition; display means for displaying the content information that satisfies the search condition and the piece of content corresponding to the content information. This brings about the effect that a search condition for content information is obtained from the user and a piece of content that satisfies the search condition is searched for.

The management table may further store a server identifier of the Web server in such a manner as to be associated with the intra-server management identifier. This brings about the effect that an intra-server management identifier is stored for each Web server.

The content management apparatus may further include recording mode storage means for storing a condition when the content information is stored in the content storage means as a recording mode. This brings about the effect that a condition when a piece of content information is attached is stored in a data area of a piece of content.

The recording mode may indicate an upper-limit value of the size of the content information when the content information is stored in the content storage means. This brings about the effect that an upper-limit value of a piece of content information when a piece of content information is attached is stored in a data area of a piece of content.

The content management apparatus may further include content information updating message analysis means for analyzing the content information updating message and extracting the content information. This brings about the effect that a piece of content information is obtained from the content information updating message.

The content information updating message may be a rich site summary or a resource description framework site summary.

According to another embodiment of the present invention, there is provided a Web server including: content receiving means for receiving a piece of content via a network; intra-server management identifier transmission means for transmitting an intra-server management identifier as a response to the reception of the piece of content; content disclosure means for disclosing the piece of content via the network; comment receiving means for receiving a comment for the disclosed piece of content via the network; content storage means for storing the piece of content and the comment in such a manner as to correspond to the intra-server management identifier; content information updating message request receiving means for receiving a request for a content information updating message containing content information on the piece of content and the intra-server management identifier; and content information updating message transmission means for transmitting the content information updating message in accordance with the request. This brings about the effect that, in the Web server, a comment regarding a piece of content stored in such a manner as to correspond to an intra-server management identifier is transmitted as a piece of content updating information.

The Web server may further include content reference count counting means for counting the number of times the disclosed piece of content is referred to via the network as a reference count, wherein the content information updating message contains the number of times the disclosed piece of content is referred to. This brings about the effect that a content information updating message containing information on the number of times a piece of content has been referred to is transmitted.

The content receiving means may receive a tag serving as a keyword of the piece of content together with the piece of content, and the content information updating message may contain the tag. This brings about the effect that a content information updating message containing information on a tag is transmitted.

According to another embodiment of the present invention, there is provided a network system including: a content management apparatus; a Web server; and a Web client, the content management apparatus, the Web server, and the Web client being interconnected with one another via a network, wherein the content management apparatus includes first content storage means for storing a piece of content together with a content unique identifier; content transmission means for transmitting the piece of content together with the content unique identifier to the Web server; intra-server management identifier receiving means for receiving an intra-server management identifier corresponding to the content unique identifier from the Web server; a management table for storing the content unique identifier and the intra-server management identifier in such a manner as to be associated with each other; content information updating message receiving means for receiving a content information updating message containing content information on the piece of content and the intra-server management identifier from the Web server; identifier conversion means for converting the intra-server management identifier contained in the content information updating message into the content unique identifier by referring to the management table; and content management means for allowing the first content storage means to store the content information on the basis of the content unique identifier, and wherein the Web server includes content receiving means for receiving the piece of content via the network; intra-server management identifier transmission means for transmitting the intra-server management identifier as a response to the reception of the piece of content; content disclosure means for disclosing the piece of content via the network; comment receiving means for receiving a comment for the disclosed piece of content from the Web client via the network; second content storage means for storing the piece of content and the comment in such a manner as to correspond to the intra-server management identifier; content information updating message request receiving means for receiving a request for the content information updating message; and content information updating message transmission means for transmitting the content information updating message in accordance with the request. This brings about the effect that, in the content management apparatus, regarding a piece of content stored in such a manner as to correspond to an intra-server management identifier in the Web server, the intra-server management identifier is converted into a content unique identifier, and the piece of content is managed using the content unique identifier.

According to the embodiment of the present invention, it is possible to obtain superior advantages such that, by efficiently managing pieces of information on pieces of content, classification properties and searchability of the pieces of information can be improved.

BRIEF DESCRIPTION OF THE DRAWINGS

FIG. 7 shows an example of storage fields of a management table 133 according to an embodiment of the present invention;

FIG. 8 shows an example of a comment RSS 800 according to an embodiment of the present invention;

FIG. 9 shows an example of a tag RSS 810 according to an embodiment of the present invention;

FIG. 10 shows an example of a reference count RSS 820 according to an embodiment of the present invention;

FIG. 11 shows an example of a plurality-of-comments display 830 according to an embodiment of the present invention;

DESCRIPTION OF THE PREFERRED EMBODIMENTS

Embodiments of the present invention will be described below in detail with reference to the drawings.

Figure 1:
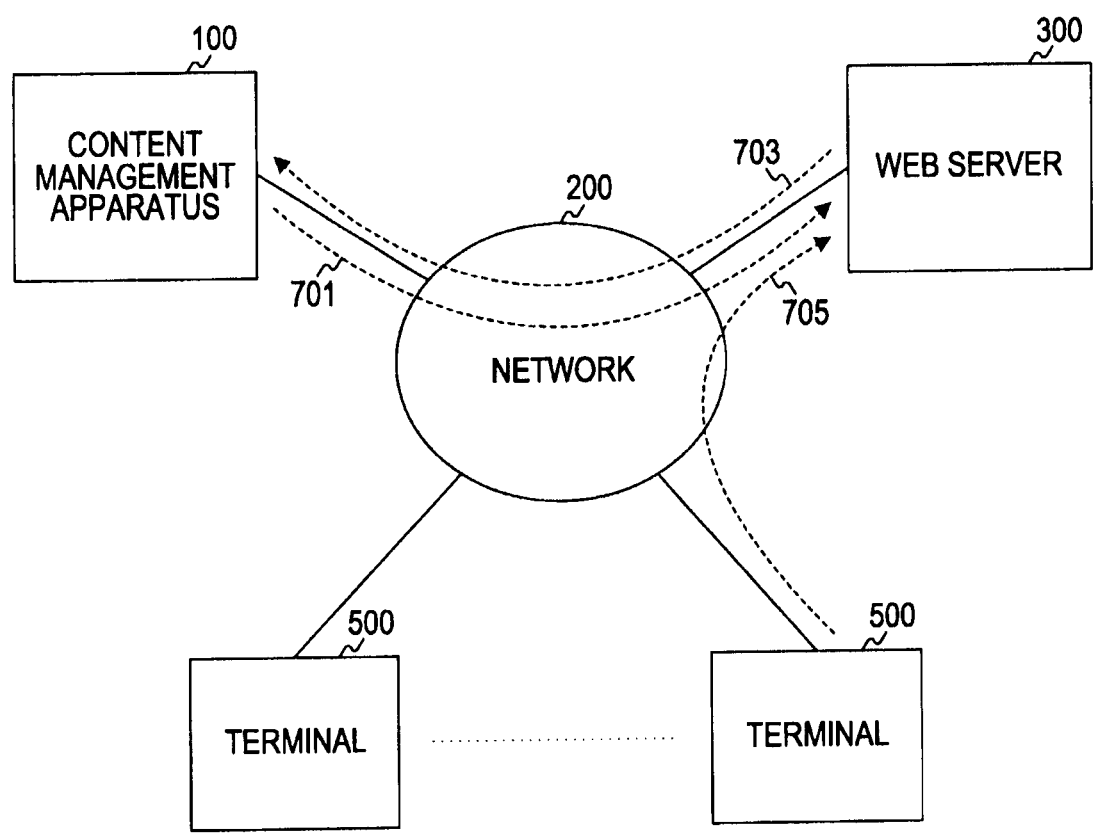
FIG. 1 shows an example of the configuration of a network system according to an embodiment of the present invention.

FIG. 1 shows an example of the configuration of a network system according to an embodiment of the present invention. The network system includes a content management apparatus 100, a network 200, a Web server 300, and a terminal 500.

The content management apparatus 100 manages pieces of content, such as image data. In the content management apparatus 100, pieces of content are classified in terms of comments attached by a user, and a search is performed on the basis of the comments. As the content management apparatus 100, for example, a digital still camera, a personal computer, or the like is assumed.

The content management apparatus 100 manages content by using a content unique identifier 701 attached to each piece of content. Each piece of content contains, for example, a content unique identifier 701 of the piece of content as metadata. As a result, when a piece of content is transmitted (uploaded) from the content management apparatus 100 to the Web server 300, the content unique identifier 701 is also transmitted together with the piece of content. The content unique identifier 701 is referred to as a guID (global unique IDentifier).

The network 200 is a communication network for transmitting information. For example, the network 200 transmits content and information on content between the content management apparatus 100 and the Web server 300. As the network 200, for example, the Internet is assumed.

The Web server 300 provides services to clients connected over the network 200. The Web server 300 discloses content to, for example, the terminal 500. Furthermore, the Web server 300 receives a comment attached from the terminal 500 and sends back a comment in response to a request from the content management apparatus 100. As the Web server 300, for example, a Web site of the Internet is assumed.

The Web server 300 manages each piece of content using an intra-server management identifier 703. When the Web server 300 receives a piece of content transmitted (uploaded) from the content management apparatus 100, the Web server 300 sends back an intra-server management identifier 703 for the piece of content to the content management apparatus 100. The intra-server management identifier 703 is referred to as an aID (article IDentifier). The terminal 500 is a user terminal connected to the network 200. The terminal 500 browses content disclosed by the Web server 300. Furthermore, the terminal 500 is used to attach a comment 705 to a specific piece of content via the network 200. As the terminal 500, for example, a personal computer connected to the Internet is assumed.

Figure 2:
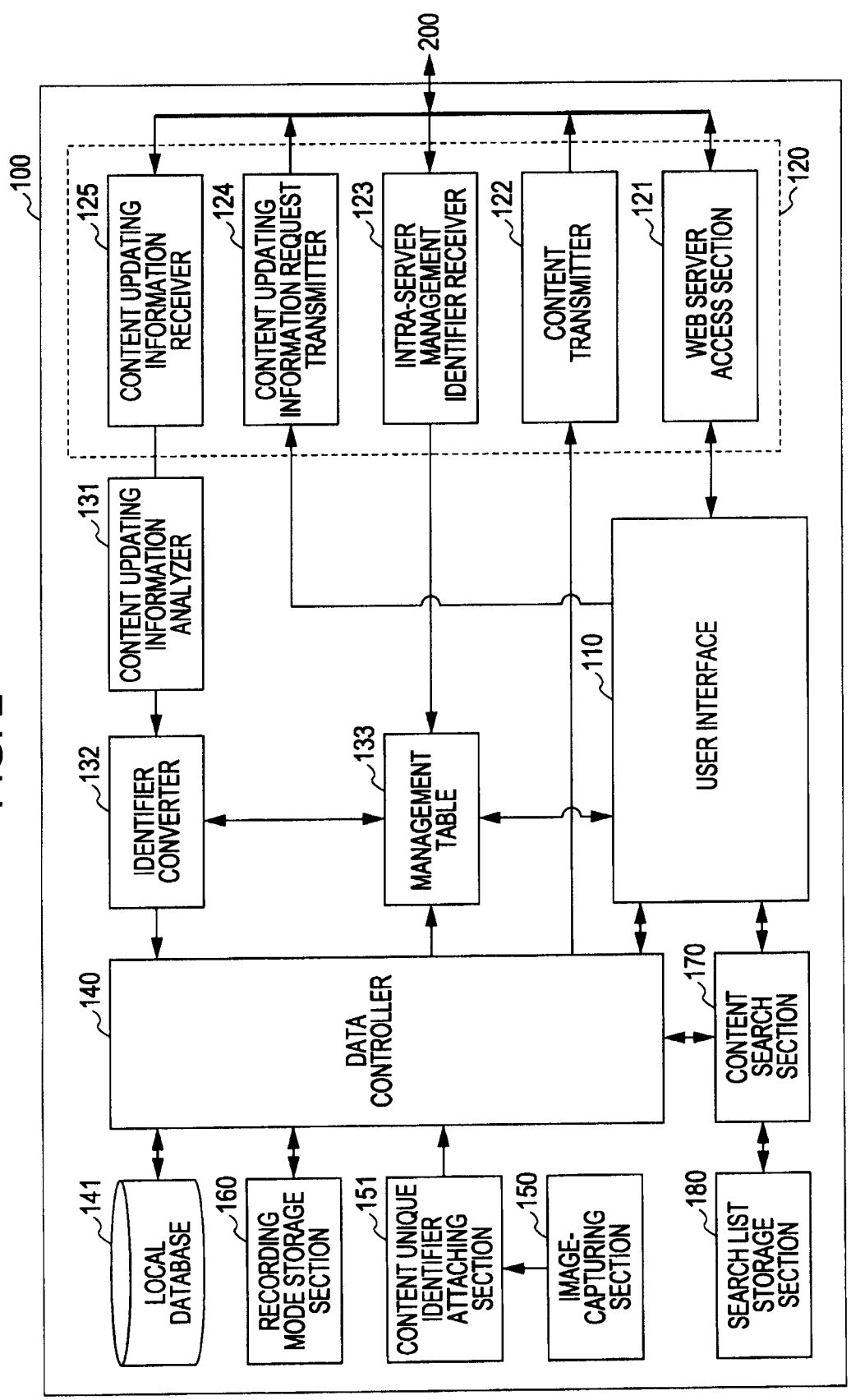
FIG. 2 shows an example of functions of a content management apparatus 100 according to an embodiment of the present invention.

FIG. 2 shows an example of functions of the content management apparatus 100 according to an embodiment of the present invention. The content management apparatus 100 includes a user interface 110, a network connection section 120, a content updating information analyzer 131, an identifier converter 132, a management table 133, a data controller 140, a local database 141, an image-capturing section 150, a content unique identifier attaching section 151, a recording mode storage section 160, a content search section 170, and a search list storage section 180.

The user interface 110 provides an interface to a user. The user interface 110 selects the Web server 300 of the content transmission target via the network connection section 120 and obtains a server identifier thereof. Then, the user interface 110 supplies an instruction for transmitting content together with the obtained server identifier to the data controller 140.

When the user interface 110 receives a request for content updating information from the user, the user interface 110 obtains an intra-server management identifier 703 corresponding to the content unique identifier 701 of the piece of content by referring to the management table 133. Then, the user interface 110 supplies an instruction for a content updating information request together with the obtained intra-server management identifier 703 to the content updating information request transmitter 124.

The network connection section 120 is an interface for connection to the network 200. The network connection section 120 includes a Web server access section 121, a content transmitter 122, an intra-server management identifier receiver 123, a content updating information request transmitter 124, and a content updating information receiver 125.

The Web server access section 121 is connected to the network 200 and accesses the Web server 300. The content transmitter 122 is connected to the network 200, and transmits (uploads) content to the Web server 300. For this uploading, XML-RPC (Remote Procedure Call), ATOM API (Application Program Interface), or the like is used.

The intra-server management identifier receiver 123 is connected to the network 200 and receives the intra-server management identifier 703 from the Web server 300. The content updating information request transmitter 124 is connected to the network 200 and transmits a request for content updating information to the Web server 300. The content updating information receiver 125 is connected to the network 200 and receives the content updating information from the Web server 300.

At this point, as the content updating information, an RSS (Rich Site Summary or RDF Site Summary) can be used. RSS stores content updating information in the Web server 300. In the RSS, as items thereof, for example, a title, an address, a header, a summary, an updating time, and the like are described.

The content updating information analyzer 131 extracts a piece of content information from the content updating information supplied from the content updating information receiver 125. The content updating information analyzer 131 supplies the extracted piece of content information to the identifier converter 132. As will be described later, the piece of content information includes the intra-server management identifier 703, a comment input by another user, the reference count by the other user, and the like.

The identifier converter 132 converts the intra-server management identifier 703 contained in the content updating information supplied from the content updating information analyzer 131 into the content unique identifier 701. The identifier converter 132 refers to the management table 133 when performing this conversion. As a result, the identifier converter 132 supplies content information to the data controller 140.

The management table 133 is a table for managing the correspondence between the content unique identifiers 701 and the intra-server management identifiers 703. The content unique identifier 701 is supplied from the data controller 140. The intra-server management identifier 703 is supplied from the intra-server management identifier receiver 123. The management table 133 is referred to when the conversion is performed by the identifier converter 132.

The data controller 140 controls the input/output of data stored in the local database 141. The data controller 140 supplies an instruction for transmitting content together with the server identifier of the transmission target, which is supplied from the user interface 110, to the content transmitter 122. Furthermore, the data controller 140 supplies the content supplied from the content unique identifier attaching section 151 to the local database 141. Furthermore, the data controller 140 supplies the content unique identifier 701 supplied from the content unique identifier attaching section 151 to the management table 133. Furthermore, the data controller 140 writes the content information supplied from the identifier converter 132 to a data area of the content in the local database 141. Furthermore, in accordance with an instruction from the content search section 170, the data controller 140 reads content from the local database 141. Furthermore, the data controller 140 allows the recording mode storage section 160 to store a recording mode and an upper-limit value or to read them.

Under the control of the data controller 140, the local database 141 stores content and the content information thereof. The stored content and the stored content information are read in accordance with a request from the content search section 170.

The image-capturing section 150 captures an image of a subject and creates content. The image-capturing section 150 supplies the image-captured content to the content unique identifier attaching section 151.

The content unique identifier attaching section 151 attaches the content unique identifier 701 to the content supplied from the image-capturing section 150. The attached content unique identifier 701 is written into a data area of the content. Content containing the content unique identifier 701 is sent to the data controller 140. At that time, the content unique identifier 701 is supplied to the management table 133 via the data controller 140.

The recording mode storage section 160 stores a recording mode and an upper-limit value of the recording capacity in the local database 141. The recording mode storage section 160 receives the recording mode and the upper-limit value of the recording capacity from the user interface 110 via the data controller 140. In the recording mode storage section 160, the recording mode and the upper-limit value are referred to from the data controller 140. At this point, the recording mode refers to a condition when the content information is stored in the local database 141. For example, when the upper-limit value of the recording capacity is exceeded, a mode for storing up-to-date content information with a higher priority, or a mode for storing existing content information with a higher priority are assumed.

The content search section 170 searches for content information stored in the local database 141. The content search section 170 searches for content information of the local database 141 via the data controller 140 in accordance with the search condition specified from the user interface 110. At that time, the content search section 170 supplies the searched result to the search list storage section 180. Then, when the search for all the content information is completed, the content search section 170 supplies the search result to the user interface 110.

The search list storage section 180 stores the search result in the content search section 170. The search result is supplied to the user interface 110 via the content search section 170.

Figure 3:
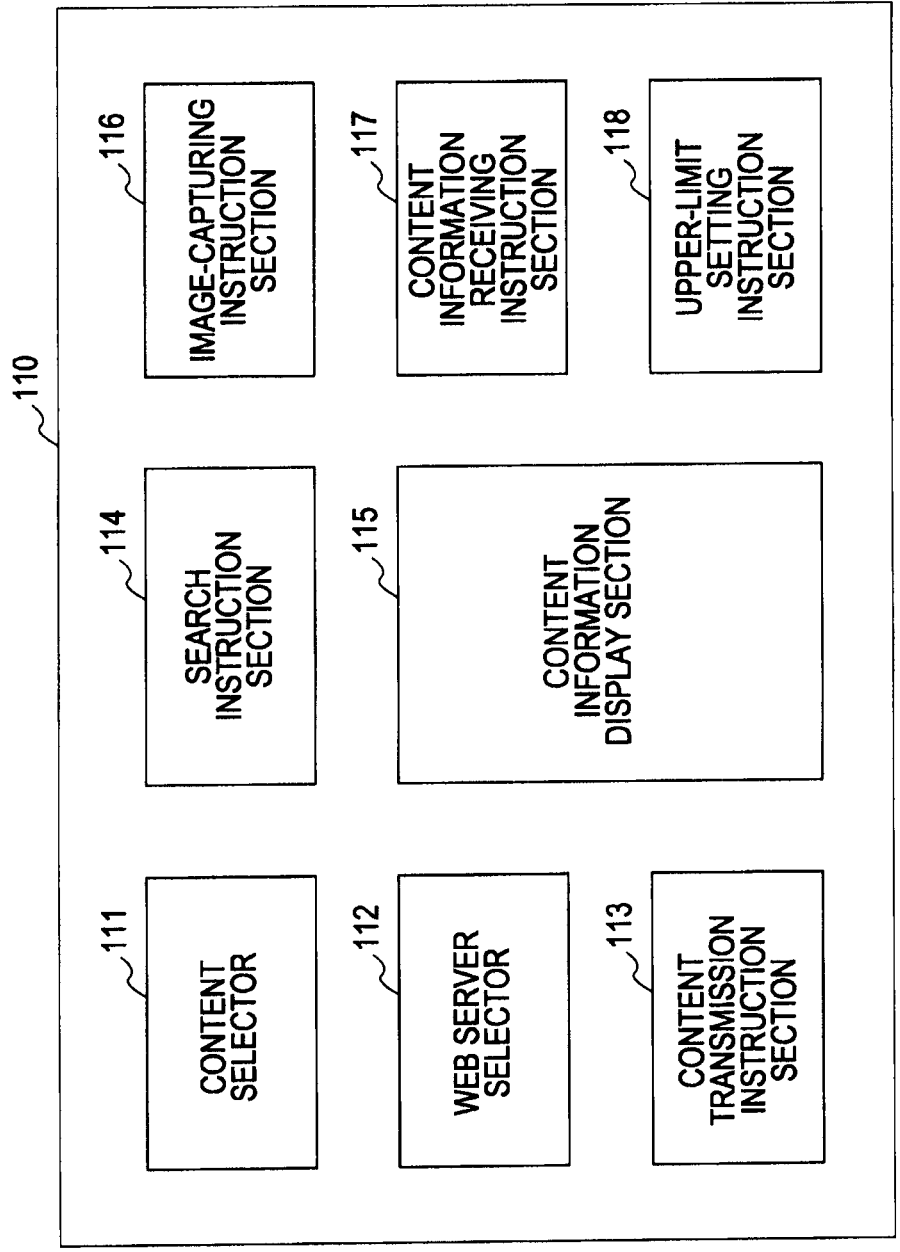
FIG. 3 shows an example of functions of a user interface 110 according to an embodiment of the present invention.

FIG. 3 shows an example of functions of the user interface 110 according to an embodiment of the present invention. The user interface 110 includes a content selector 111, a Web site selector 112, a content transmission instruction section 113, a search instruction section 114, a content information display section 115, an image-capturing instruction section 116, and a content information receiving instruction section 117.

The content selector 111 selects content to be transmitted (uploaded) to the Web server 300. That is, the content selector 111 selects the content stored in the local database 141 in accordance with an instruction from the user.

The Web site selector 112 selects the Web server 300 that serves as an upload target. That is, the Web site selector 112 selects the Web server 300 of the network 200 in accordance with an instruction from the user.

The content transmission instruction section 113 instructs the transmission of content to the Web server 300. That is, the content transmission instruction section 113 instructs the data controller 140 to transmit content.

The search instruction section 114 accepts an input of a search condition and instructs the content search section 170 to search for content. That is, the search instruction section 114 instructs the content search section 170 to search for content information stored in the local database 141 in accordance with the search condition input from the user.

The content information display section 115 displays content and content information.

The image-capturing instruction section 116 instructs the image-capturing section 150 to capture an image of a subject.

The content information receiving instruction section 117 instructs the content updating information request transmitter 124 to receive content information.

Figure 4:
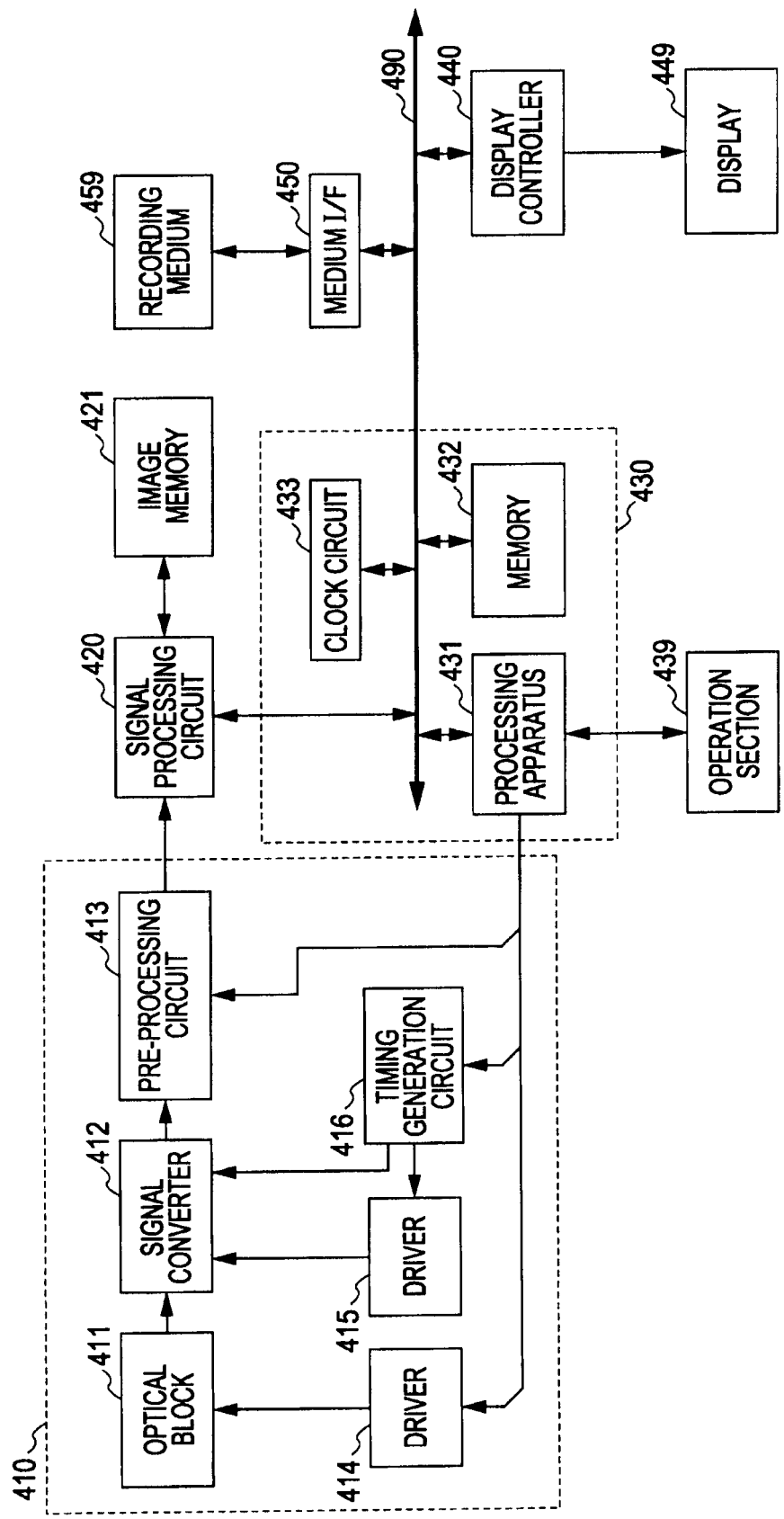
FIG. 4 shows an example of the configuration of a digital still camera 400 according to an embodiment of the present invention.

FIG. 4 shows an example of the configuration of a digital still camera 400 according to an embodiment of the present invention. The digital still camera 400 includes a camera section 410, a signal processing circuit 420, a controller 430, a display controller 440, and a medium interface 450. An image memory 421 is connected to the signal processing circuit 420, an operation section 439 is connected to the controller 430, and a display 449 is connected to the display controller 440. Furthermore, a recording medium 459 can be loaded into or removed from the medium interface 450.

The camera section 410 captures an image of a subject and generates image data. The camera section 410 includes an optical block 411, a signal converter 412, a pre-processing circuit 413, a driver 414 for the optical block, a driver 415 for the signal converter, and a timing generation circuit 416.

The optical block 411 includes a lens, a focus mechanism, a shutter mechanism, an aperture (iris), and the like. The optical block 411 receives the image of a subject and supplies it to the signal converter 412. Under the control of the controller 430, the driver 414 for the optical block forms a driving signal for operating the optical block 411 and supplies the driving signal to the optical block 411 so that the optical block 411 is operated.

The signal converter 412 photoelectrically converts an image from the optical block 411 and outputs it. On the basis of a driving signal from the driver 415 for the signal converter and a timing signal from the timing generation circuit 416, receives the image of the subject from the optical block 411, and supplies it as an electrical signal to the pre-processing circuit 413. As such a signal converter 412, a CCD (Charge Coupled Device) can be used.

The pre-processing circuit 413 performs a CDS (Correlated Double Sampling) and an AGC (Automatic Gain Control) on the image information of the electrical signal supplied from the signal converter 412. The CDS process is a process for maintaining the signal/noise ratio (S/N ratio) at a satisfactory value, and the AGC process is a process for controlling a gain. The pre-processing circuit 413 performs A/D (analog/digital) conversion on the signal obtained in this manner in order to form image data using a digital signal.

The signal processing circuit 420 performs camera signal processing, such as AF (Auto Focus), AE (Auto Exposure), and AWB (Auto White Balance), on the image data from the pre-processing circuit 413. Furthermore, the signal processing circuit 420 compresses the image data on which various adjustments have been performed in this manner by a predetermined compression method, and supplies the image data after being compressed to a recording medium 459 via the bus 490 and a medium interface 450. Furthermore, the signal processing circuit 420 performs a process for decompressing the compressed image data on the recording medium 459, and supplies the decompressed image data to the display controller 440 via the bus 490. The image memory 421 is used as a data area necessary during the compression or decompression process.

The controller 430 controls the entire image-capturing apparatus, and is configured in such a manner that a processing apparatus 431, a memory 432, and a clock circuit 433 are interconnected with one another via a bus 490. Here, the memory 432 is used as a work area for storing a program executed by the processing apparatus 431 and for temporarily storing data necessary for processing. The work area for a program may be formed of a flash ROM and the work area for data may be formed of a RAM. The clock circuit 433 has a function of providing image capture date and time and the like together with image data by supplying the present year-month-date, the current day, the current time, and the like. The clock circuit 433 can also be used to count the time of a self-timer.

The operation section 439 transmits operations input from the user to the processing apparatus 431 and, for example, a touch panel, a control key, or the like can be assumed. In response to an operation input from the operation section 439, the controller 430 controls an input/output operation to and from the recording medium 459, a display operation for the display 449, and the like.

The display controller 440 forms an image signal for the display 449 on the basis of the supplied image data and supplies the image signal to the display 449. As a result, an image corresponding to the image data recorded on the recording medium 459 is displayed on the display screen of the display 449. As the display 449, for example, an LCD (Liquid Crystal Display) can be used.

The medium interface 450 writes image data onto the recording medium 459 and reads image data from the recording medium 459. As the recording medium 459, various kinds of recording media, for example, a so-called memory card using a semiconductor memory, an optical recording medium such as a recordable DVD (Digital Versatile Disk) or a recordable CD (Compact Disc), and a magnetic disk, can be used.

Figure 5:
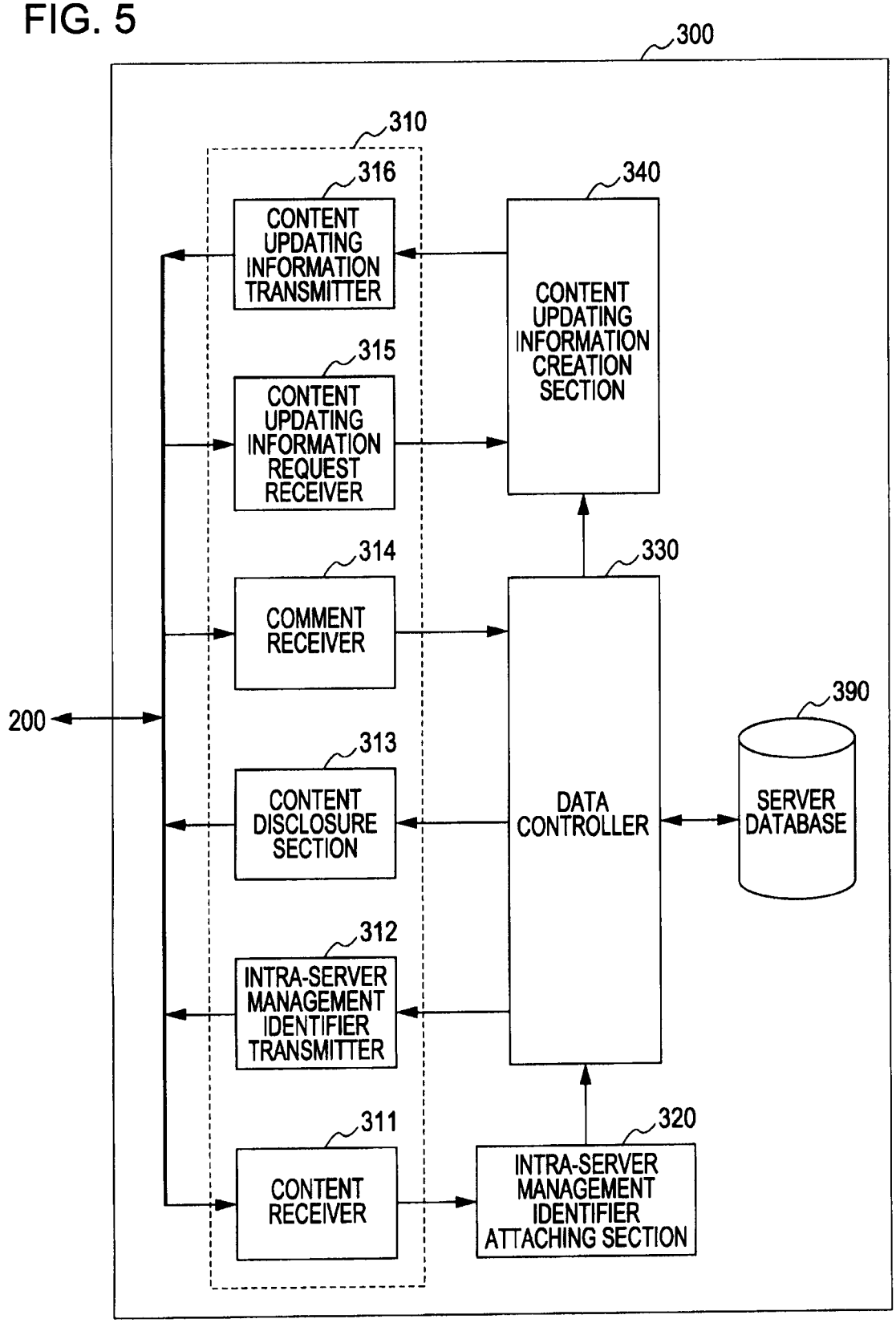
FIG. 5 shows an example of functions of a Web server 300 according to an embodiment of the present invention.

FIG. 5 shows an example of functions of the Web server 300 according to an embodiment of the present invention. The Web server 300 includes a network connection section 310, an intra-server management identifier attaching section 320, a data controller 330, a content updating information creation section 340, and a server database 390.

The network connection section 310 is an interface for connection to the network 200. The network connection section 310 includes a content receiver 311, an intra-server management identifier transmitter 312, a content disclosure section 313, a comment receiver 314, a content updating information request receiver 315, and a content updating information transmitter 316.

The content receiver 311 receives content from the content management apparatus 100 via the network 200. Then, the content receiver 311 supplies the received content to the intra-server management identifier attaching section 320.

The intra-server management identifier transmitter 312 transmits the intra-server management identifier 703 to the content management apparatus 100 via the network 200. At that time, the intra-server management identifier 703 is supplied to the intra-server management identifier transmitter 312 from the data controller 330.

The content disclosure section 313 discloses content to the terminal 500 via the network 200. At that time, the content is supplied to the content disclosure section 313 from the data controller 330.

The comment receiver 314 receives a comment from the terminal 500 via the network 200. Then, the comment receiver 314 supplies the received comment to the data controller 330.

The content updating information request receiver 315 receives a request for content updating information from the content management apparatus 100 via the network 200. Then, the content updating information request receiver 315 supplies the request for the content updating information to the content updating information creation section 340.

The content updating information transmitter 316 transmits the content updating information to the content management apparatus 100 via the network 200. At that time, the content updating information is supplied to the content updating information transmitter 316 from the content updating information creation section 340.

The intra-server management identifier attaching section 320 attaches the intra-server management identifier 703 to the content supplied from the content receiver 311. The attached intra-server management identifier 703 and the content are supplied to the data controller 330.

The data controller 330 controls input/output of data stored in the server database 390. That is, the data controller 330 supplies the content supplied from the intra-server management identifier attaching section 320 to the local database 141. The data controller 330 supplies the content supplied from the intra-server management identifier attaching section 320 to the content disclosure section 313. Furthermore, the data controller 330 supplies the intra-server management identifier 703 supplied from the intra-server management identifier attaching section 320 to the intra-server management identifier transmitter 312. Furthermore, the data controller 330 stores the comment supplied from the comment receiver 314 in the server database 390.

In response to a request from the content updating information request receiver 315, the content updating information creation section 340 obtains content updating information from the server database 390. Then, the content updating information creation section 340 supplies the content updating information to the content updating information transmitter 316. The content updating information creation section 340 creates content updating information on the basis of the comment (content information) stored in the server database 390 independently of another processing in the Web server 300. The created content updating information is stored in the server database 390 in preparation for a request for content information.

Figure 6:
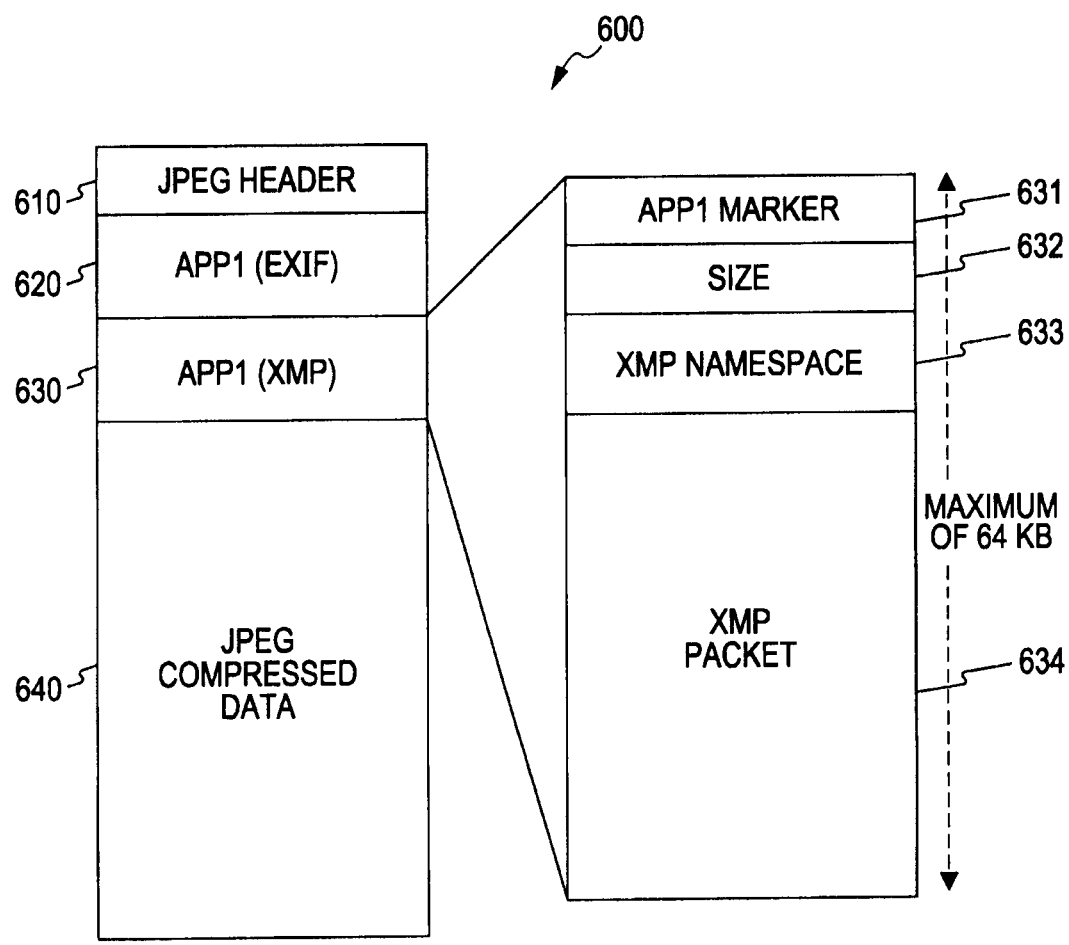
FIG. 6 shows an example of the structure of a data area 600 managed by the content management apparatus 100 according to an embodiment of the present invention.

FIG. 6 shows an example of the structure of a data area 600 managed by the content management apparatus 100 according to an embodiment of the present invention. The data area 600 is a content file stored in the local database 141, with JPEG compressed data 640 compressed by a JPEG format being stored therein. At this point, JPEG (Joint Photographic coding Expert Group) is an image data compression method. At the beginning of the data area 600, a JPEG header 610 is attached as a header area.

In the data area 600, an area called an APP1 (APPlication marker header 1) for storing information (hereinafter referred to as "meta-information") on the JPEG compressed data 640 is contained. In the APP1 area, for example, APP1 (EXIF) 620 and APP1 (XMP) 630 are stored.

The APP1 (EXIF) 620 is an area for storing meta-information using EXIF. At this point, EXIF (Exchangeable Image File Format) is a standard of meta-information for a digital still camera. In the APP1 (EXIF) 620, a content unique identifier 701 is stored in, for example, an area (tag ID=37500) of a maker note (MakerNote). Furthermore, in the APP1 (EXIF) 620, the comment, the tag, and the reference count can be stored in, for example, an area (tag ID=37510) of a user comment (UserComment).

The APP1 (XMP) 630 is an area for storing meta-information using XMP. At this point, XMP (Extensible Metadata Platform) is a standard of meta-information on digital media.

The APP1 (XMP) 630 contains division areas of an APP1 marker 631, a size 632, an XMP namespace 633, and an XMP packet 634. The total maximum size of the APP1 (XMP) 630 is 64 KB (kilobytes).

The APP1 marker 631 is an area to which a marker indicating the start position of the XMP data is written. As the marker, specifically, "0xFFE1" is used (an alphanumeric character that follows "0x" means a hexadecimal number).

The size 632 is an area for storing the total value of the data size in the XMP namespace 633 and the XMP packet 634.

The XMP namespace 633 is an area for storing the URI (Uniform Resource Identifier) of the XMP namespace as a character string using ASCII code. This area stores the URI of document type definition (DTD) for defining tags and attributes used in the XML. As a result, it is possible to use a prefix without attaching a URI to a tag.

The XMP packet 634 is an area for storing content information. In the APP1 (XMP) 630, the comment, the tag, and the reference count can be described in an XML format in the XMP packet 634.

FIG. 7 shows an example of storage fields of the management table 133 according to an embodiment of the present invention. The management table 133 contains each of the fields of the content unique identifier 710, the server identifier 720, and the intra-server management identifier 730. That is, each of the entries of the management table 133 stores the intra-server management identifier 730 in the server identifier 720 in such a manner as to correspond to the content unique identifier 710.

The content unique identifier 710 is a field for storing the content unique identifier 701 of each piece of content. The content unique identifier 701 is attached by the content unique identifier attaching section 151 of the content management apparatus 100.

The server identifier 720 is a field for storing the server identifier of the Web server 300. As the server identifier, for example, a URL (Uniform Resource Locator) address or the like can be used.

The intra-server management identifier 730 is a field for storing the intra-server management identifier 703 in the Web server 300. The intra-server management identifier 703 is attached by the intra-server management identifier attaching section 320 of the Web server 300.

FIG. 8 shows an example of a comment RSS 800 according to an embodiment of the present invention. The comment RSS 800 stores information on a comment among the content updating information created by the content updating information creation section 340 of the Web server 300.

The comment RSS 800 is described using RDF (Resource Description Framework) syntax, with an intra-server management identifier 801 and a comment 802 being contained therein. The intra-server management identifier 801 is described as a portion of the URI of the Web server 300 in compliance with a "rdf: resource" attribute. Furthermore, the comment 802 is described using a "description" tag in an XML format.

At this point, the intra-server management identifier 801 is attached by the intra-server management identifier attaching section 320 of the Web server 300. The comment 802 has been supplied from the content receiver 311 to the content updating information creation section 340 via the data controller 330.

FIG. 9 shows an example of a tag RSS 810 according to an embodiment of the present invention. The tag RSS 810 stores information on a tag for the classification of content among content updating information created by the content updating information creation section 340 of the Web server 300.

The tag RSS 810 has been described using RDF syntax similarly to the comment RSS 800, with an intra-server management identifier 811 and a tag 812 being contained therein. Similarly to the case of the comment RSS 800, the intra-server management identifier 801 is described as a portion of the URI of the Web server 300 in compliance with a "rdf: resource" attribute. Furthermore, the tag 812 is described using a "dc: subject" tag in an XML format. The tag 812 is used for the classification of content, and differs from a tag in an XML format.

At this point, the intra-server management identifier 811 is attached by the intra-server management identifier attaching section 320 of the Web server 300. The tag 812 is received together with the content by the content receiver 311 of the Web server 300 and is supplied to the content updating information creation section 340 via the intra-server management identifier attaching section 320 and the data controller 330.

FIG. 10 shows an example of a reference count RSS 820 according to an embodiment of the present invention. The reference count RSS 820 stores information on the reference count among the content updating information created by the content updating information creation section 340 of the Web server 300.

Similarly to the comment RSS 800, the reference count RSS 820 is described using RDF syntax, with an intra-server management identifier 821 and a reference count 822 being contained therein. Similarly to the case of the comment RSS 800, the intra-server management identifier 821 is described as a portion of the URI of the Web server 300 in compliance with a "rdf: resource" attribute. Furthermore, the reference count 822 is described using a "description" tag in the XML format.

At this point, the intra-server management identifier 821 is attached by the intra-server management identifier attaching section 320 of the Web server 300. Furthermore, the reference count 822 indicates the number of times the corresponding content has been referred to by the terminal 500 via the Web server 300, which is counted by the data controller 330 and supplied to the content updating information creation section 340.

FIG. 11 shows an example of a plurality-of-comments display 830 according to an embodiment of the present invention. The content information display section 115 in the user interface 110 of the content management apparatus 100 provides the plurality-of-comments display 830 to the user. The plurality-of-comments display 830 contains a file name 831, a plurality of comments 832, a tag 833, and a reference count 834.

The file name 831 shows an identifier provided to the content in managing content as a file in the content management apparatus 100.

The plurality of comments 832 shows a plurality of comments provided to the content. These comments have been provided from the terminal 500 to the disclosed content and are information on the comments stored in the XMP packet 634 or the like in the data area 600 of the content.

The tag 833 shows a tag provided to the content. This tag is information on classification, which has been attached by the user when the content was uploaded, and is information on the tag held in the XMP packet 634 within the data area 600 of the content.

The reference count 834 shows the number of times content has been referred to by the terminal 500 via the Web server 300. The reference count, which is referred to herein, is the number of times content has been referred to by the terminal 500 via the Web server 300, and is information on the reference count, which is held in the XMP packet 634 within the data area 600 of the content.

Figure 12:
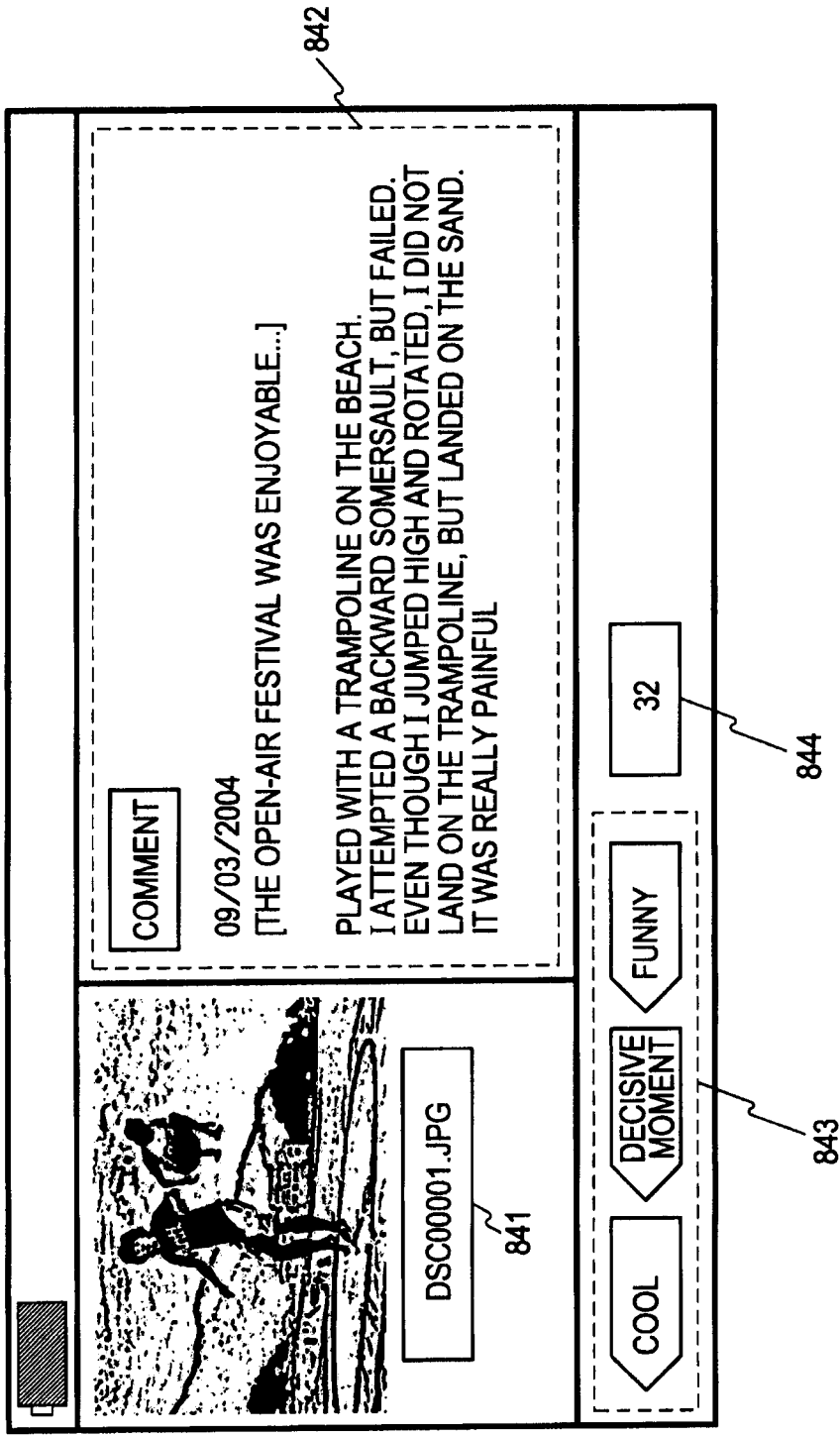
FIG. 12 shows an example of a single comment display 840 according to an embodiment of the present invention.

FIG. 12 shows an example of a single comment display 840 according to an embodiment of the present invention. The single comment display 840 is provided to the user by the content information display section 115 in the user interface 110 of the content management apparatus 100. The single comment display 840 contains a file name 841, a single comment 842, a tag 843, and a reference count 844.

The file name 841 shows an identifier provided to content in managing content as a file in the content management apparatus 100.

The single comment 842 shows one comment selected by the user among the plurality of comments provided to the content. This comment has been provided from the terminal 500 to the disclosed content and is information on the comment held in the XMP packet 634 or the like within the data area 600 of the content.

The tag 843 shows a tag provided to content. This tag is information on classification, which was attached by the user when the content was uploaded, and is information on a tag held in the XMP packet 634 within the data area 600 of the content.

The reference count 844 shows the number of times a piece of content has been referred to by the terminal 500 via the Web server 300. The reference count, which is referred to herein, indicates the number of times a piece of content has been referred to by the terminal 500 via the Web server 300, and is held in the XMP packet 634 within the data area 600 of the piece of content.

Figure 13:
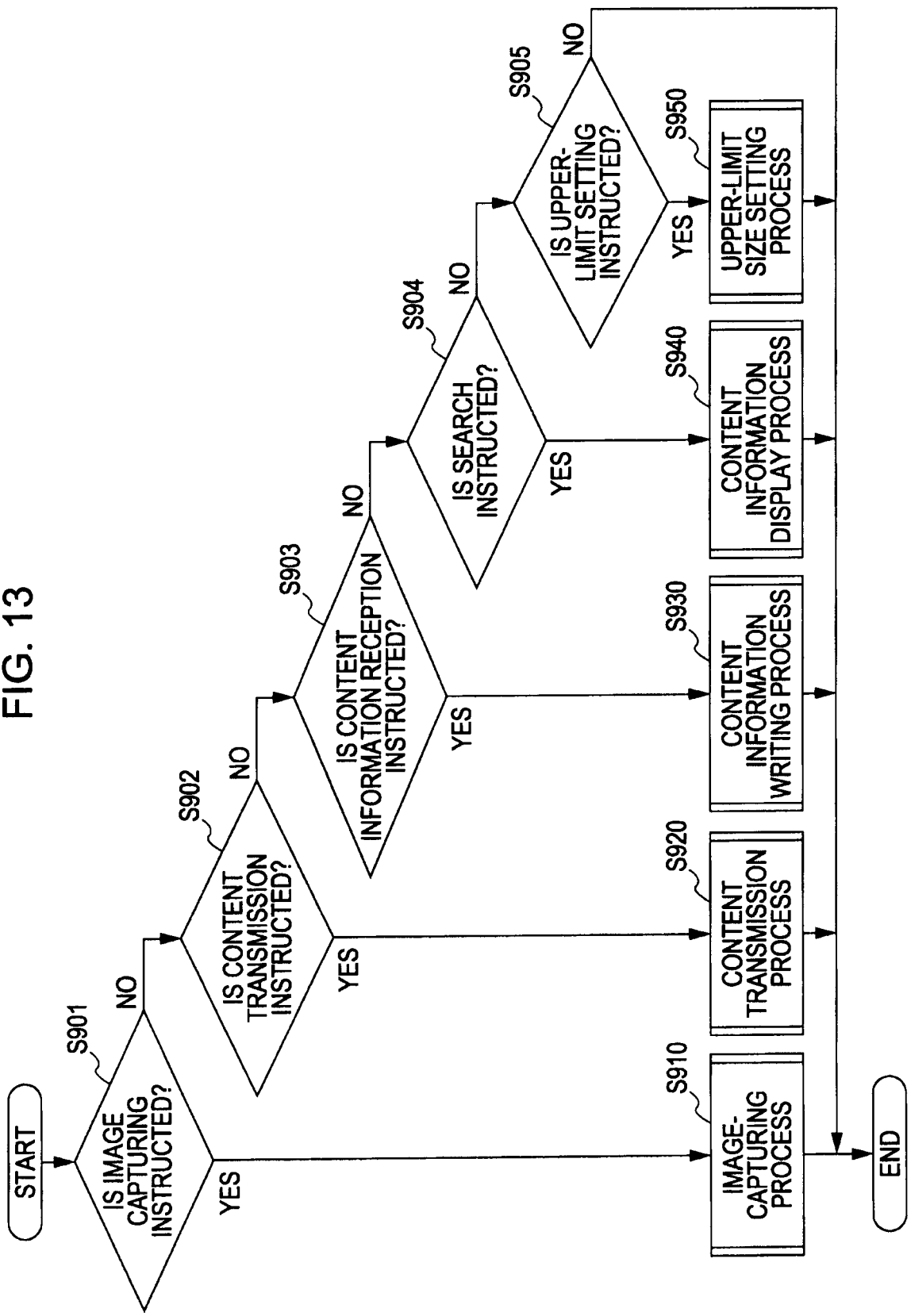
FIG. 13 shows an example of processing (main routine) performed by a computer of the content management apparatus 100 according to an embodiment of the present invention.

FIG. 13 is a flowchart showing an example of processing (main routine) performed by a computer of the content management apparatus 100 according to an embodiment of the present invention. The content management apparatus 100 receives an instruction from the user via the user interface 110. Depending on the content of this instruction, corresponding processing is performed in the manner described below.

When image capturing is instructed (step S901), an image-capturing process (step S910) is performed. When an instruction for transmitting content is made (step S902), a content transmission process (step S920) is performed. When an instruction for receiving content information is made (step S903), a content information writing process (step S930) is performed. When a search instruction is made (step S904), a content information display process (step S940) is performed. When an upper-limit setting instruction is made (step S905), an upper-limit size setting process (step S950) is performed.

Figure 14:
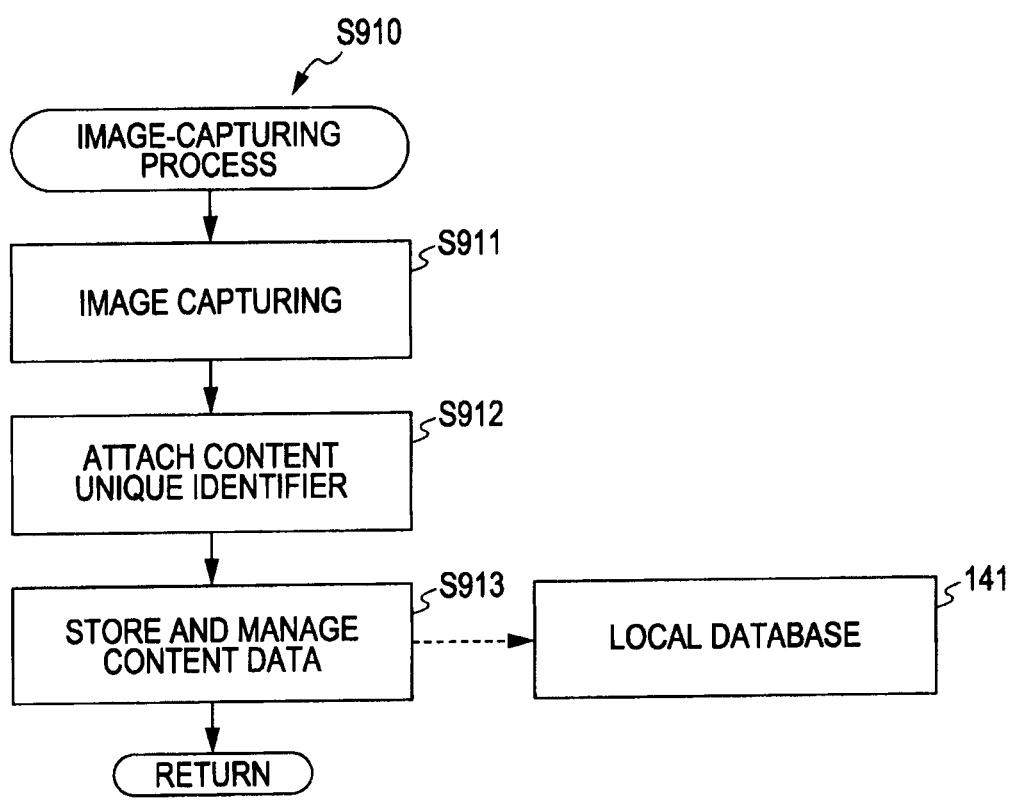
FIG. 14 is a flowchart showing an example of a processing procedure of an image-capturing process (step S910) according to an embodiment of the present invention.

FIG. 14 is a flowchart showing an example of a processing procedure of an image-capturing process (step S910) according to an embodiment of the present invention. This processing is a subroutine performed within the processing (main routine) performed by the computer of the content management apparatus 100.

At first, when an image of a subject is captured by the image-capturing section 150 (step S911), a content unique identifier 701 is attached to the piece of thus generated content by the content unique identifier attaching section 151 (step S912). The piece of content to which the content unique identifier 701 is attached is stored in the local database 141 (step S913).

Figure 15:
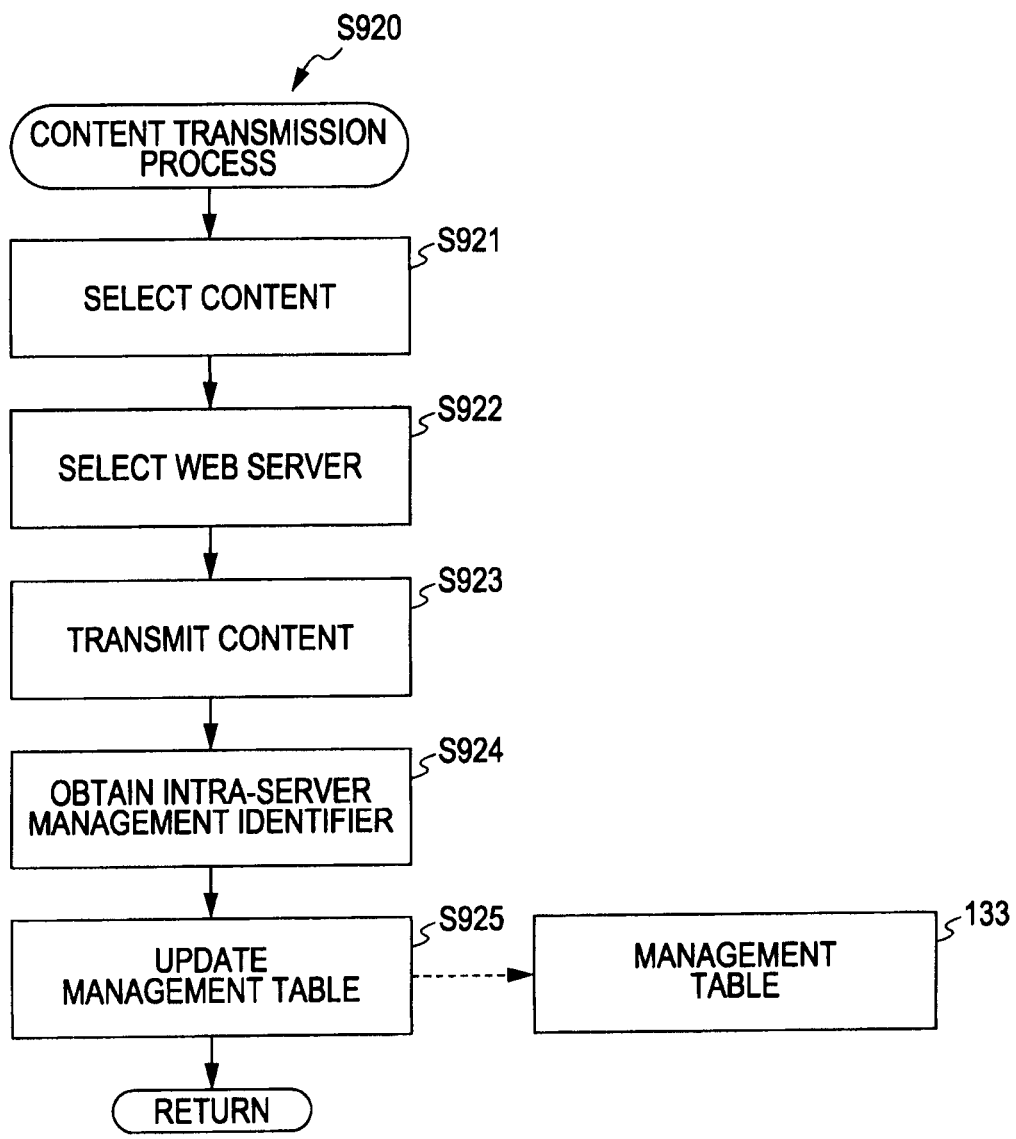
FIG. 15 is a flowchart showing an example of a processing procedure of a content transmission process (step S920) according to an embodiment of the present invention.

FIG. 15 is a flowchart showing an example of a processing procedure of a content transmission process (step S920) according to an embodiment of the present invention. This processing is a subroutine performed within the processing (main routine) performed by the computer of the content management apparatus 100.

At first, the content selector 111 selects a piece of content stored in the local database 141 (step S921). Then, the Web site selector 112 selects the Web server 300 of the upload target (step S922). The content selected earlier is transmitted to the selected Web server 300 via the network 200 (step S923).

As a response to this transmission, the intra-server management identifier 703 is supplied to the intra-server management identifier receiver 123 (step S924). The intra-server management identifier 703 is supplied to the management table 133. As a result, the management table 133 is updated (step S925).

Figure 16:
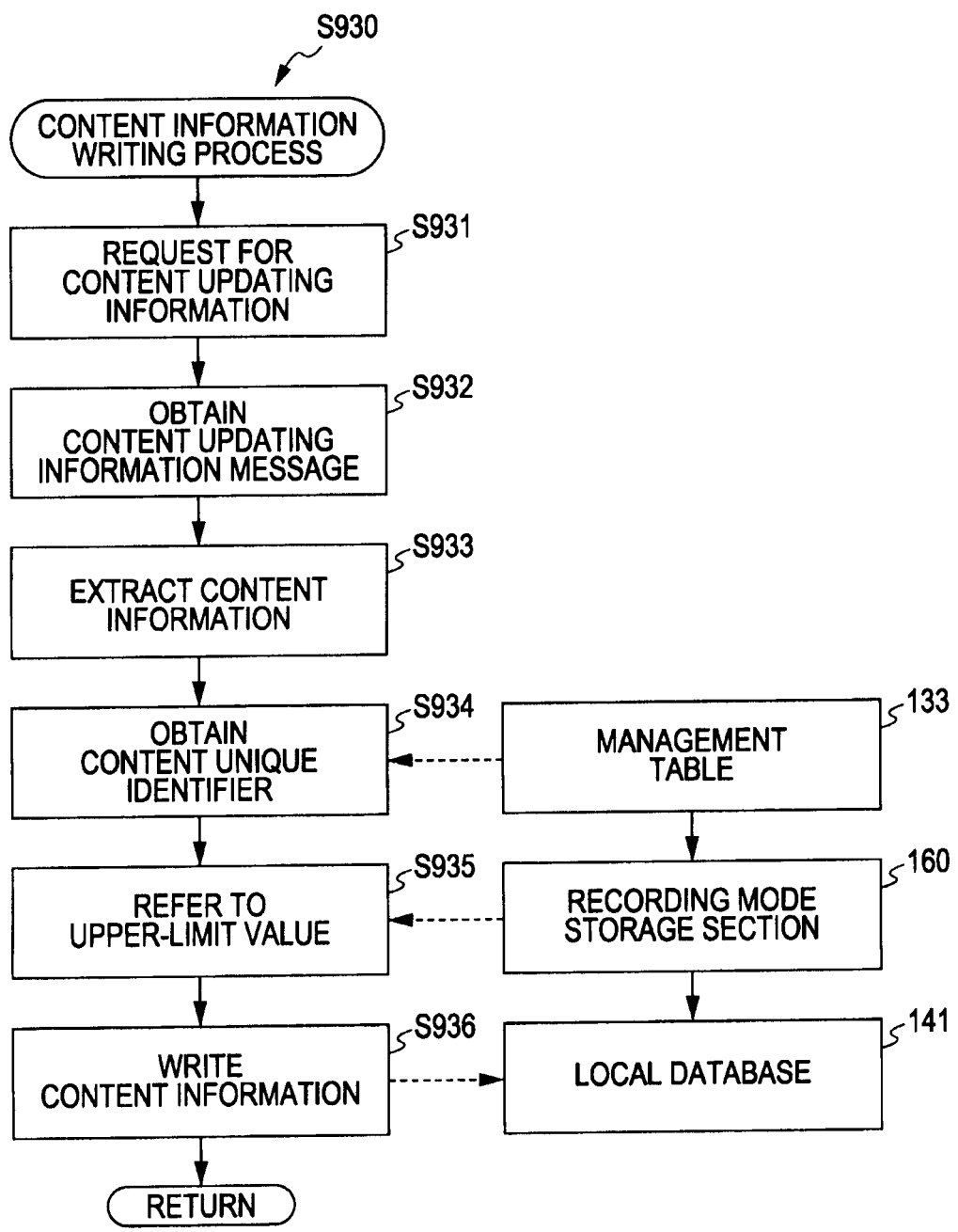
FIG. 16 is a flowchart showing an example of a processing procedure of a content information writing process (step S930) according to an embodiment of the present invention.

FIG. 16 is a flowchart showing an example of a processing procedure of a content information writing process (step S930) according to an embodiment of the present invention. This processing is a subroutine performed within processing (main routine) performed by the computer of the content management apparatus 100.

At first, a request for content updating information is transmitted from the content updating information request transmitter 124 to the Web server 300 via the network 200 (step S931).

As a response to this transmission, a content information updating message is supplied to the content updating information receiver 125 (step S932). The content information updating message is analyzed by the content updating information analyzer 131, thereby extracting content information (step S933). The extracted content information (hereinafter referred to as "content information") is supplied to the identifier converter 132.

Next, the identifier converter 132 converts the intra-server management identifier 703 contained in the content information into the content unique identifier 701 (step S934). At this point, the content unique identifier 701 corresponding to the intra-server management identifier 703 has been supplied from the management table 133. The content information after the identifier is converted is supplied to the data controller 140.

Thereafter, the data controller 140 refers to an upper-limit value (step S935). At this point, the upper-limit value has been supplied from the recording mode storage section 160. The upper-limit value is an upper-limit value of the size of content information to be written to the data area 600 of the content. Then, the content information is written to the data area 600 of the content stored by the local database 141 in the range of the above-described upper-limit value (step S936).

Figure 17:
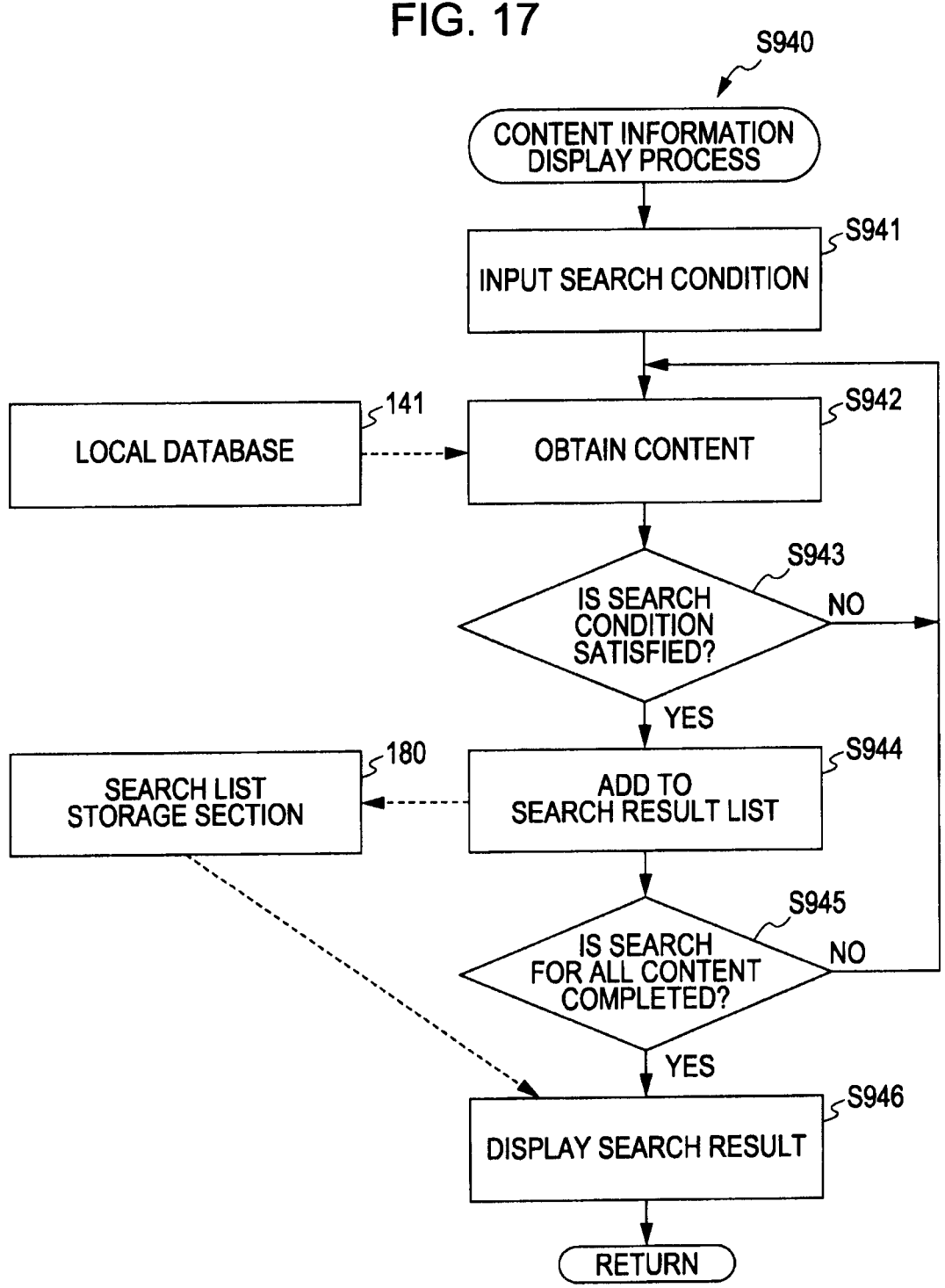
FIG. 17 is a flowchart showing an example of a processing procedure of a content information display process (step S940) according to an embodiment of the present invention.

FIG. 17 is a flowchart showing an example of a processing procedure of a content information display process (step S940) according to an embodiment of the present invention. This processing is a subroutine performed within the processing (main routine) performed by the computer of the content management apparatus 100.

At first, when a search condition for comment information on content is input and a search instruction is made in the search instruction section 114 (step S941), first content is obtained from the local database 141 (step S942). It is determined whether or not the content information attached to the obtained content satisfies the search condition (step S943). When the content information satisfies the search condition, the content unique identifier 701 and the content information thereof are added to the search list (step S944). Then, the search list is supplied to the search list storage section 180.

On the other hand, when the content information of the first content does not satisfy the search condition, second content is obtained (step S942). Then, the same processing as that described above is repeated on the content information of all the content.

Thereafter, it is determined whether or not the search for content information of all the content has been completed (step S945). When the search has been completed, the search result is supplied from the search list storage section 180, and the search result is displayed (step S946).

Figure 18:
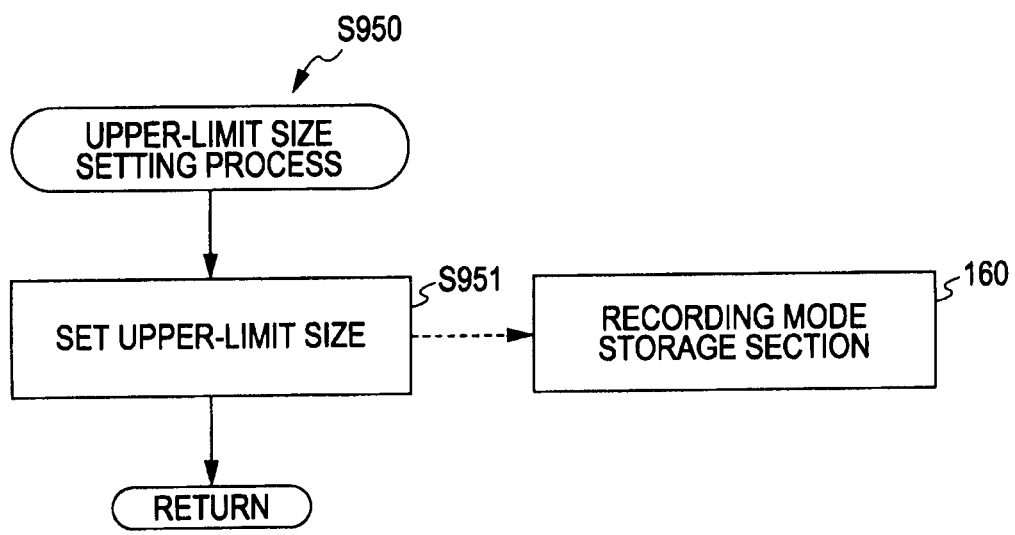
FIG. 18 is a flowchart showing an example of a processing procedure of an upper-limit size setting process (step S950) according to an embodiment of the present invention.

FIG. 18 is a flowchart showing an example of a processing procedure of an upper-limit size setting process (step S950) according to an embodiment of the present invention. This processing is a subroutine performed within processing (main routine) performed by the computer of the content management apparatus 100.

In this processing, the upper-limit setting instruction section 118 sets an upper-limit value of the size of content information to be written to the data area 600 of the content (step S951). At this point, this value is supplied to the recording mode storage section 160.

Figure 19:
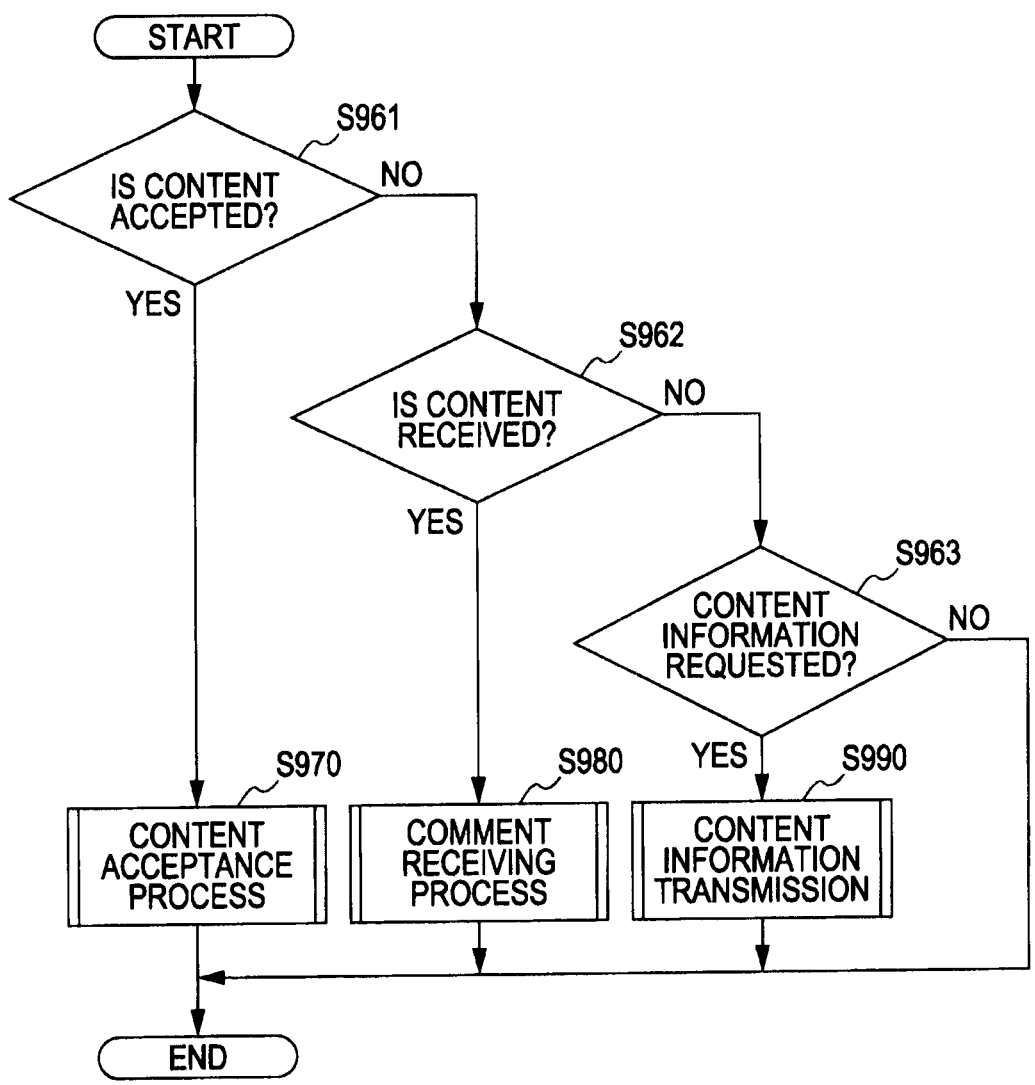
FIG. 19 is a flowchart showing an example of processing (main routine) performed by a computer of the Web server 300 according to an embodiment of the present invention.

FIG. 19 is a flowchart showing an example of processing (main routine) performed by the computer of the Web server 300 according to an embodiment of the present invention. The Web server 300 receives a request for content or content information from the content management apparatus 100 via the network 200. Similarly, the Web server 300 receives a comment from the terminal 500. Depending on the receiving party and the received content, corresponding processing is performed in the manner described below.

When content is received from the content management apparatus 100 (step S961), a content acceptance process (step S970) is performed. Furthermore, when a comment is received from the terminal 500 (step S962), a comment receiving process (step S980) is performed. Furthermore, when a request for content information is received from the content management apparatus 100 (step S963), content information transmission (step S990) is performed.

Figure 20:
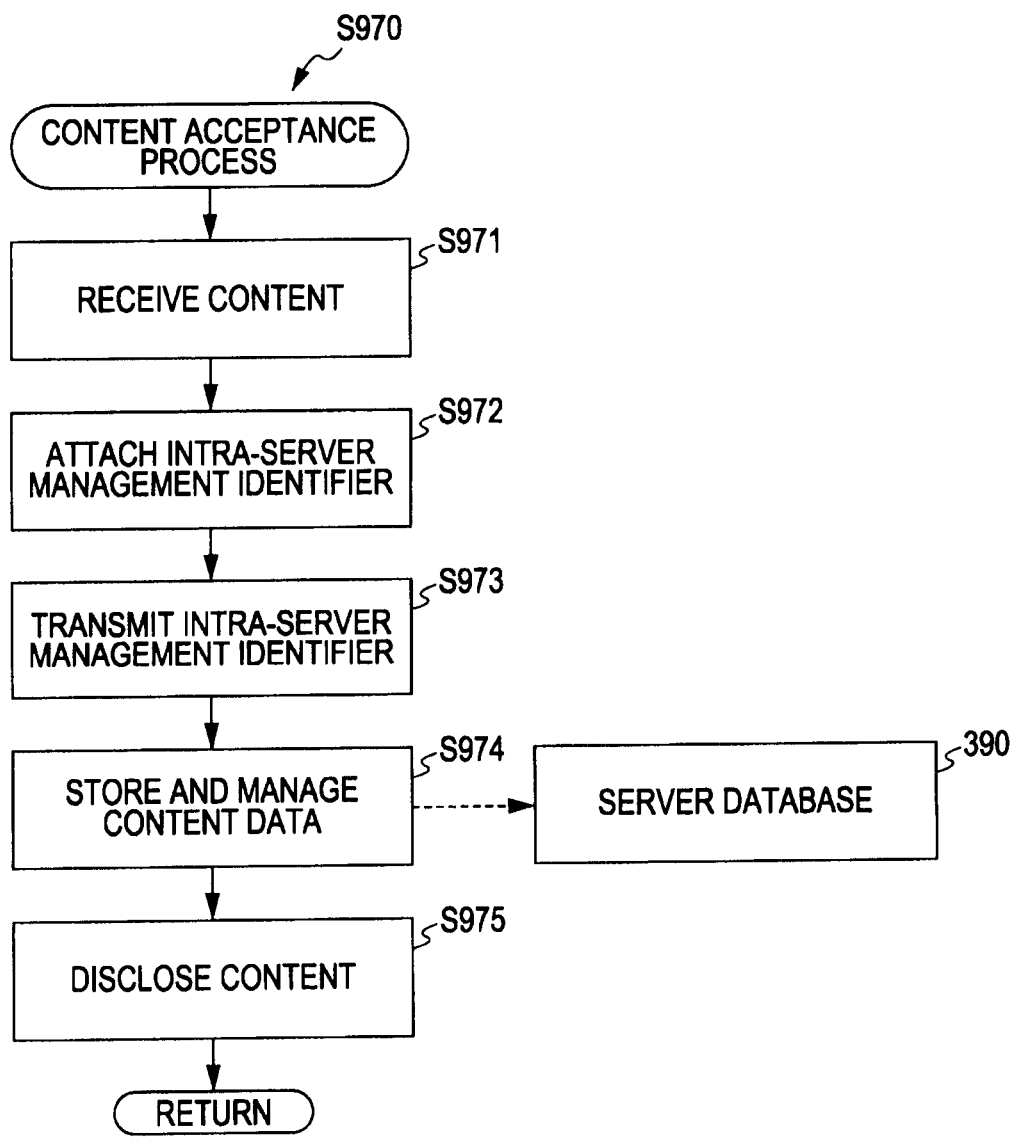
FIG. 20 is a flowchart showing an example of a processing procedure of a content acceptance process (step S970) according to an embodiment of the present invention.

FIG. 20 is a flowchart showing an example of a processing procedure of a content acceptance process (step S970) according to an embodiment of the present invention. This processing is a subroutine performed within processing (main routine) performed by the computer of the Web server 300.

At first, when the content receiver 311 receives content (step S971), the intra-server management identifier 703 is attached to the thus received content by the intra-server management identifier attaching section 320 (step S972).

Next, the data controller 330 transmits the intra-server management identifier 703 from the intra-server management identifier transmitter 312 to the content management apparatus 100 via the network 200 as a response that the content has been received (step S973). Furthermore, the content to which the intra-server management identifier 703 has been attached is stored in the server database 390 via the data controller 330 (step S974). Furthermore, the content to which the intra-server management identifier 703 has been attached is disclosed to the terminal 500 from the content disclosure section 313 via the network 200 (step S975).

Figure 21:
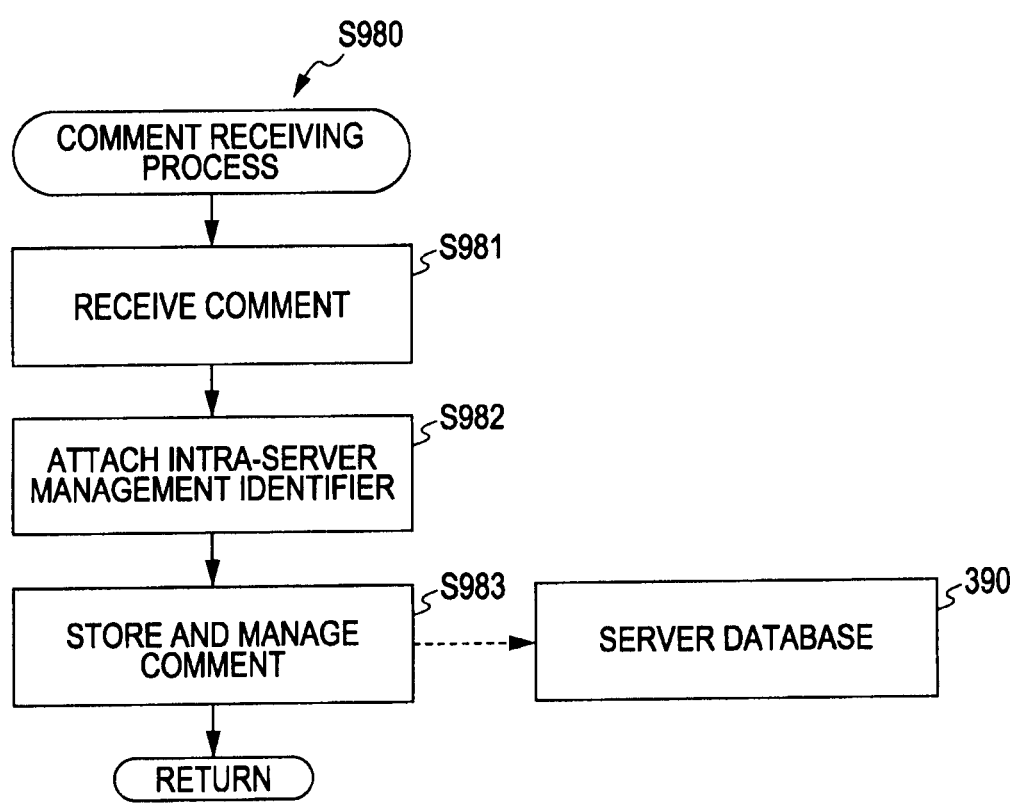
FIG. 21 is a flowchart showing an example of a comment receiving process (step S980) according to an embodiment of the present invention.

FIG. 21 is a flowchart showing an example of a comment receiving process (step S980) according to an embodiment of the present invention. This processing is a subroutine performed within the processing (main routine) performed by the computer of the Web server 300.

At first, the comment receiver 314 receives the comment attached from the terminal 500 (step S981). The intra-server management identifier 703 is attached to the comment by the data controller 330 (step S982). As a result, the correspondence between the comment and the piece of content is formed. Then, the comment is stored in the server database 390 (step S983).

Figure 22:
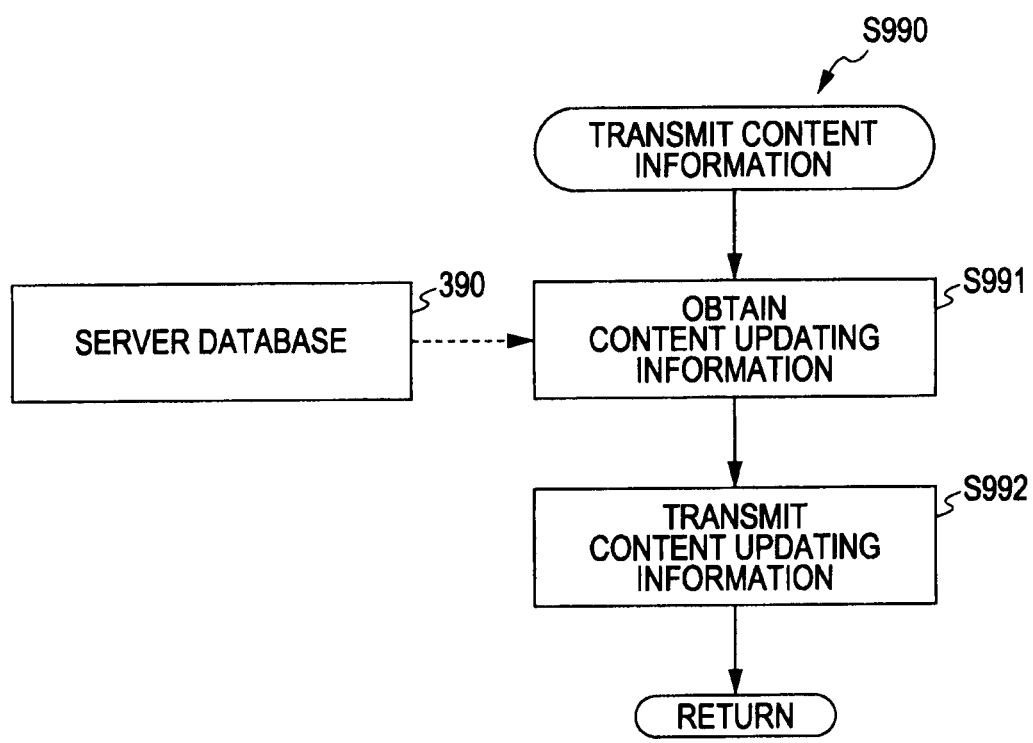
FIG. 22 is a flowchart showing an example of a processing procedure of content information transmission (step S990) according to an embodiment of the present invention.

FIG. 22 is a flowchart showing an example of a processing procedure of content information transmission (step S990) according to an embodiment of the present invention. This processing is a subroutine performed within the processing (main routine) performed by the computer of the Web server 300. As the content updating information, an RSS can be used.

At first, the content updating information creation section 340 obtains content updating information from the server database 390 (step S991). The obtained content updating information is supplied to the content updating information transmitter 316. Then, the content updating information transmitter 316 transmits the content updating information to the content management apparatus 100 via the network 200 (step S992). As the content updating information, an RSS can be used.

Figure 23:
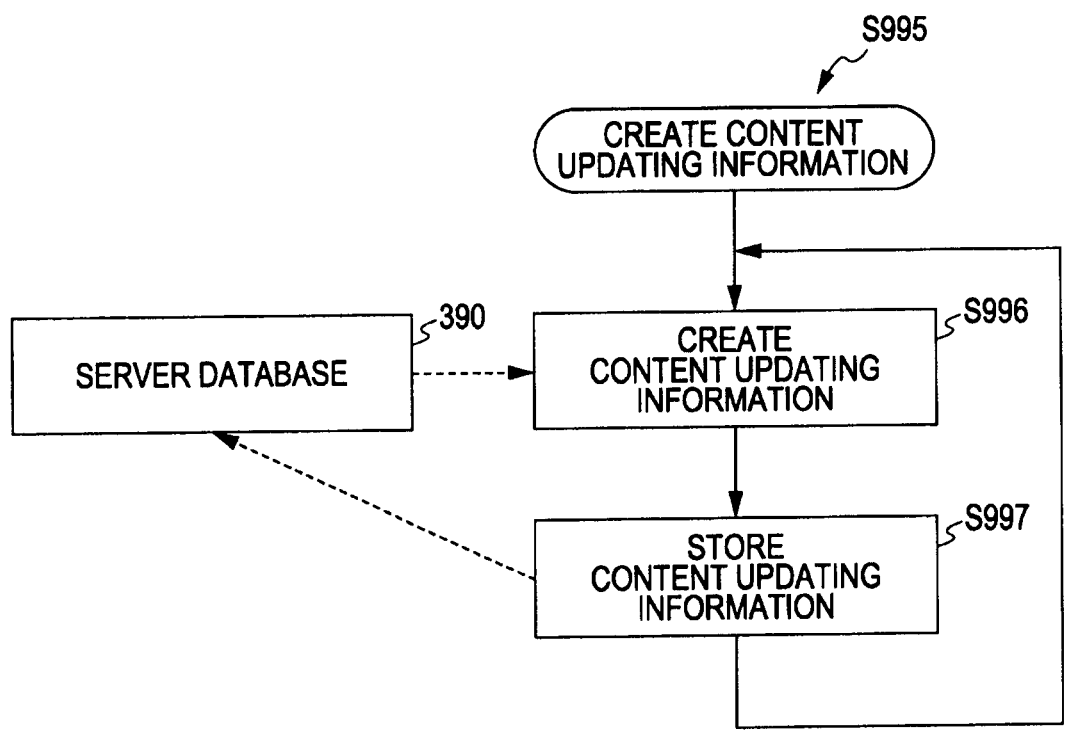
FIG. 23 is a flowchart showing an example of a processing procedure of content updating information creation (step S995) according to an embodiment of the present invention.

FIG. 23 is a flowchart showing an example of a processing procedure of content updating information creation (step S995) according to an embodiment of the present invention. This processing is a loop performed independently of the processing (main routine) performed by the computer of the Web server 300.

At first, the content updating information creation section 340 creates content updating information on the basis of the content information stored in the server database 390 (step S996). The created content updating information is stored again in the server database 390 in preparation for a request for content information (step S997).

In the embodiment of the present invention, the digital still camera 400 has been described as an example of the content management apparatus 100. The content management apparatus according to the embodiment of the present invention is not limited to this example and may be a personal computer or the like. As an example of content, the data structure of image data using a JPEG format has been described. The content may be in a compression format other than the JPEG format and may be, for example, various kinds of media files, such as music data.

As has thus been described, according to the embodiment of the present invention, by sending back the intra-server management identifier 703 of the content to the content management apparatus 100 in response to an upload of content to the Web server 300 from the content management apparatus 100, it is possible to maintain the correspondence between the content unique identifier 701 and the intra-server management identifier 703 in the management table 133. As a result, it is possible to efficiently manage each piece of content together with a comment attached from the terminal 500.

The embodiments of the present invention show examples for embodying the present invention, and have the correspondence with the features of the claims as described below. However, the embodiments are not limited to the examples, and various modifications are possible within the spirit and scope of the present invention.

That is, in the content management apparatus according to an embodiment of the present invention, the content storage means corresponds to, for example, the local database 141. The content transmission means corresponds to, for example, the content transmitter 122. The intra-server management identifier receiving means corresponds to, for example, the intra-server management identifier receiver 123. The management table corresponds to, for example, the management table 133. The content information updating message receiving means corresponds to, for example, the content updating information receiver 125. The identifier conversion means corresponds to, for example, the identifier converter 132. The content management means corresponds to, for example, the data controller 140.

The image-capturing means corresponds to, for example, the image-capturing section 150. The content unique identifier attaching means corresponds to, for example, the content unique identifier attaching section 151.

The content information updating message request means corresponds to, for example, the content updating information request transmitter 124.

The search condition acceptance means corresponds to, for example, the search instruction section 114. The content search means corresponds to, for example, the content search section 170. The display means corresponds to, for example, the content information display section 115.

The recording mode storage means corresponds to, for example, the recording mode storage section 160.

The content information updating message analysis means corresponds to, for example, the content updating information analyzer 131.

In the Web server according to an embodiment of the present invention, the content receiving means corresponds to, for example, the content receiver 311. The intra-server management identifier transmission means corresponds to, for example, the intra-server management identifier transmitter 312. The content disclosure means corresponds to, for example, the content disclosure section 313. The comment receiving means corresponds to, for example, the comment receiver 314. The content storage means corresponds to, for example, the server database 390. The content information updating message request receiving means corresponds to, for example, the content updating information request receiver 315. The content information updating message transmission means corresponds to, for example, the content updating information transmitter 316.

The content reference count counting means corresponds to, for example, the data controller 330.

In the content management method or the program according to an embodiment of the present invention, the content transmission procedure corresponds to, for example, step S923. The intra-server management identifier receiving procedure corresponds to, for example, step S924. The content information updating message receiving procedure corresponds to, for example, step S932. The identifier conversion procedure corresponds to, for example, step S934. The content management procedure corresponds to, for example, step S913.

In the content management method or the program according to an embodiment of the present invention, the content receiving procedure corresponds to, for example, step S971. The intra-server management identifier transmission procedure corresponds to, for example, step S973. The content disclosing procedure corresponds to, for example, step S975. The comment receiving procedure corresponds to, for example, step S981. The content information updating message request receiving procedure corresponds to, for example, step S990. The content information updating message transmission procedure corresponds to, for example, step S992.

The processing procedure described in the embodiment of the present invention may be regarded as a method including the series of steps, as a program allowing a computer to execute the series of steps, or as a recording medium storing the program.

It should be understood by those skilled in the art that various modifications, combinations, sub-combinations and alterations may occur depending on design requirements and other factors insofar as they are within the scope of the appended claims or the equivalents thereof.

What is claimed is:

1. A content management system comprising:
    a transmission unit configured to transmit a piece of content and an associated content identifier to a web server;
    a management unit configured to store the content identifier in association with an intra-server management identifier received from the web server, the intra-server management identifier identifying the piece of content on the web server, the intra-server management identifier being different from the content identifier;
    a receiving unit configured to receive the intra-server management identifier and update information corresponding to the piece of content from the web server; and
    a content management unit configured to store the update information as meta-information related to the content identified by the content identifier.

2. The content management system according to claim 1, further comprising:
    a control unit configured to control simultaneous display of the content and the update information.

3. The content management system according to claim 1, wherein the update information is a tag to classify the content on the web server.

4. The content management system according to claim 3, wherein the piece of content is a digital image.

5. The content management system according to claim 2, wherein the update information is a tag to classify the content on the web server.

6. The content management system according to claim 4, wherein the piece of content is a digital image.

7. The content management apparatus according to claim 1, wherein the management unit records the intra-server management identifier and an associated content identifier.

8. The content management system according to claim 1, wherein the update information is a keyword.

9. A method of management content on an information processing apparatus, comprising:
- transmitting, from a transmission unit, a piece of content and an associated content identifier to a web server;
- storing, in a storage unit, the content identifier in association with an intra-server management identifier received from the web server, the intra-server management identifier identifying the piece of content on the web server, the intra-server management identifier being different from the content identifier;
- receiving, in a receiving unit, the intra-server management identifier and update information corresponding to the piece of content from the web server; and
- controlling, in a content management unit, the storage unit to store the update information as meta-information related to the content identified by the content identifier.

10. The method according to claim 9, further comprising:
- controlling, by a control unit, simultaneous display of the content and the update information.

11. The method according to claim 9, wherein the update information is a tag to classify the content on the web server.

12. The method according to claim 9, wherein the piece of content is a digital image.

13. The method according to claim 9, wherein the update information is a rich site summary.

14. The method according to claim 9, wherein the update information is a resource description framework site summary.

15. The method according to claim 9, further comprising:
- recording the intra-server identifier and an associated content identifier.

16. The method according to claim 11, wherein the tag is a keyword.

17. The method according to claim 9, wherein the meta-information related to the content identified by the content identifier is stored in a meta-information area of the content.

18. The method according to claim 9, wherein the update information is a comment.

19. The method according to claim 9, wherein the content identifier is stored in association with the intra-server management identifier in a content management table.

20. The method according to claim 9, further comprising:
- receiving a search condition to search contents; and
- displaying a result of a content search based on the search condition.

21. A computer-readable medium storing computer-readable instruction thereon, the computer-readable instructions, when executed by a computer cause the computer to perform the method comprising:
- transmitting a piece of content and an associated content identifier to a web server;
- storing the content identifier in association with an intra-server management identifier received from the web server, the intra-server management identifier identifying the piece of content on the web server, the intra-server management identifier being different from the content identifier;
- receiving the intra-server management identifier and update information corresponding to the piece of content from the web server; and
- controlling storage of the update information as meta-information related to the content identified by the content identifier.

22. The computer-readable medium according to claim 21, further comprising:
- controlling, by a control unit, simultaneous display of the content and the update information.

23. The computer-readable medium according to claim 21, wherein the update information is a tag to classify the content on the web server.

24. The computer-readable medium according to claim 21, wherein the piece of content is a digital image.

25. The computer-readable medium according to claim 21, wherein the update information is a rich site summary.

26. The computer-readable medium d according to claim 21, wherein the update information is a resource description framework site summary.

27. The computer-readable medium according to claim 21, further comprising:
- recording the intra-server identifier and an associated content identifier.

28. The computer-readable medium according to claim 21, wherein the update information is a keyword.

29. The computer-readable medium according to claim 21, wherein the meta-information related to the content identified by the content identifier is stored in a meta-information area of the content.

30. The computer-readable medium according to claim 21, wherein the update information is a comment.

31. The computer-readable medium according to claim 21, wherein the content identifier is stored in association with the intra-server management identifier in a content management table.

32. The computer-readable medium according to claim 21, further comprising:
- receiving a search condition to search contents; and
- displaying a result of a content search based on the search condition.

* * * * *